United States Patent
Deixler et al.

(10) Patent No.: US 10,601,516 B2
(45) Date of Patent: Mar. 24, 2020

(54) EMITTING CODED LIGHT FROM A MULTI-LAMP LUMINAIRE

(71) Applicant: SIGNIFY HOLDING B.V., Eindhoven (NL)

(72) Inventors: Peter Deixler, Arlington, MA (US); Haimin Tao, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/309,991

(22) PCT Filed: Jun. 19, 2017

(86) PCT No.: PCT/EP2017/064867
§ 371 (c)(1),
(2) Date: Dec. 14, 2018

(87) PCT Pub. No.: WO2018/001762
PCT Pub. Date: Jan. 4, 2018

(65) Prior Publication Data
US 2019/0132055 A1    May 2, 2019

(30) Foreign Application Priority Data

Jun. 27, 2016  (EP) .................... 16176313

(51) Int. Cl.
| *H04B 10/516* | (2013.01) |
| *H05B 37/02* | (2006.01) |
| *H04B 10/116* | (2013.01) |
| *H04B 10/50* | (2013.01) |
| *H04B 10/114* | (2013.01) |
| *H04B 10/60* | (2013.01) |
| *H04B 10/40* | (2013.01) |
| *H04B 10/112* | (2013.01) |

(52) U.S. Cl.
CPC ......... *H04B 10/516* (2013.01); *H04B 10/116* (2013.01); *H04B 10/502* (2013.01); *H05B 37/0272* (2013.01); *H04B 10/112* (2013.01); *H04B 10/114* (2013.01); *H04B 10/1143* (2013.01); *H04B 10/1149* (2013.01); *H04B 10/40* (2013.01); *H04B 10/50* (2013.01); *H04B 10/60* (2013.01)

(58) Field of Classification Search
None
See application file for complete search history.

(56) References Cited

U.S. PATENT DOCUMENTS

2006/0056855 A1* 3/2006 Nakagawa ............... G09F 9/33
398/183
2007/0058987 A1* 3/2007 Suzuki ............... H04B 10/1141
398/183

(Continued)

*Primary Examiner* — Darren E Wolf
(74) *Attorney, Agent, or Firm* — Akarsh P. Belagodu

(57) ABSTRACT

A method of operating a group of lamps in a multi-lamp luminaire, each lamp being operable to emit respective illumination embedded with a predetermined coded light message, and each comprising a respective local controller; wherein the method comprises: communicating between the local controllers of the lamps within the multi-lamp luminaire in order to coordinate that unsynchronized instances of said coded light message are not transmitted from different ones of the lamps in the multi-lamp luminaire.

14 Claims, 7 Drawing Sheets

(56) References Cited

U.S. PATENT DOCUMENTS

| | | | |
|---|---|---|---|
| 2009/0297167 A1* | 12/2009 | Nakagawa | G09F 9/33 398/182 |
| 2010/0067916 A1* | 3/2010 | Suzuki | H04B 10/116 398/130 |
| 2014/0167620 A1 | 6/2014 | Chobot | |
| 2014/0334826 A1 | 11/2014 | Kido et al. | |
| 2015/0102733 A1 | 4/2015 | Knapp et al. | |
| 2018/0359030 A1* | 12/2018 | Hoekstra | H04B 10/116 |

\* cited by examiner

EMITTING CODED LIGHT FROM A MULTI-LAMP LUMINAIRE

CROSS-REFERENCE TO PRIOR APPLICATIONS

This application is the U.S. National Phase application under 35 U.S.C. § 371 of International Application No. PCT/EP2017/064867, filed on Jun. 19, 2017, which claims the benefit of European Patent Application No. 16176313.1, filed on Jun. 27, 2016. These applications are hereby incorporated by reference herein.

TECHNICAL FIELD

The present disclosure relates to a lamp for use amongst one or more other lamps in a multi-lamp luminaire, wherein the lamps are operable to emit coded light. For instance the lamps may be retrofittable LED-based replacements for traditional fluorescent tubes or filament bulbs.

BACKGROUND

A luminaire (light fixture) is a device comprising at least one lamp for emitting illumination, and any associated socket, support and/or housing. A luminaire may take any of a variety of forms, such as a conventional ceiling or wall mounted luminaire, free standing luminaire or wall washer, or a less conventional form such as an illumination source built into a surface or an item of furniture, or any other type of lighting device for emitting illumination into an environment. The lamp refers to an individual light-emitting component within a luminaire, of which there may be one or more per luminaire. The lamp may also take any of a number of forms, such as an LED-based lamp, a gas-discharge lamp, or a filament bulb. An increasingly popular form of lamp is a retrofittable LED-based lamp comprising one or more LEDs as the means by which to emit illumination, but being made retrofittable into a luminaire designed for a traditional filament bulb or fluorescent tube.

A luminaire or even an individual lamp may also be equipped with a wireless communication interface allowing the luminaire or lamp to be controlled remotely by lighting control commands received from a user device such as a smartphone, tablet, laptop or desktop computer, or wireless wall-switch; and/or based on sensor readings received from one or more remote sensors. Nowadays, the communication interface can be included directly within the lamp itself (e.g. in the end-cap of a retrofittable replacement for a filament bulb or fluorescent tube). For example this can allow a user, through the user device, to turn the lamp's illumination on and off, to dim the illumination level up or down, to change the colour of the emitted illumination, and/or to create a dynamic (time varying) lighting effect. In one form, the communication interface is configured to receive the lighting control commands and/or to share sensor data via a local, short-range radio access technology such as Wi-Fi, 802.15.4, ZigBee or Bluetooth. Such lamps may sometimes be referred to as "connected" lamps.

One type of connected lamp is an instant-fit "tube LED" (TLED) lamp which retrofits into a luminaire designed for traditional fluorescent tubes. According to the instant-fit TLED approach, the existing fixed-output fluorescent ballast, the TLED lamp-holders and also all the electrical wiring within the luminaire remain unchanged. Via straightforward re-lamping, existing "dumb" fluorescent tubes (or even "dumb" TLED tubes) can be exchanged with dimmable connected TLEDs each having an individual, integrated wireless radio.

In other "smart" or "connected" lighting applications, there is provided the ability to embed data into the illumination emitted by a luminaire, by modulating a property such as the intensity of the emitted light in order to encode the data (preferably at a high enough frequency to be beyond human perception or at least tolerable to humans). This is sometimes referred to as "coded light" (CL) or "visible light communication" (VLC).

For instance, each luminaire may be arranged to emit a different respective ID code unique to the respective luminaire (at least being unique within the system in question, e.g. within a given building). A look up table may also be made available to a mobile user terminal, e.g. being hosted on a server and made available via a local wireless network and/or the Internet, or being stored locally on the user terminal. The look up table maps at least one respective piece of information to each of the IDs, e.g. the location of the respective luminaire. By using a light sensor (e.g. camera) built into the user terminal, an application running on the user terminal can detect the ID embedded in the light currently encountered at the user's present location (e.g. the user points the camera up towards a particular luminaire). The application then accesses the look-up table to look-up the information mapped to the ID. E.g. if this information comprises the location of the respective luminaire, this can be taken as the approximate location of the user terminal (and therefore the user). In more sophisticated variants, the light and respective embedded IDs from a plurality of nearby luminaires can be used by the application to compute a more precise position fix, using measurements of the received coded-light signals (e.g. received signal strength, time-of-flight, and/or angle of arrival) and a suitable positioning algorithm (e.g. triangulation, trilateration, multilateration and/or fingerprinting).

Such techniques have a particular application for indoor positioning where satellite-based positioning systems (e.g. GPS, Galileo or GLONASS) cannot penetrate. However there is nothing to stop such positioning techniques being used outdoors as well. Either way, these positioning (i.e. localization) techniques can be used for a number of purposes such as navigation, i.e. displaying the user's current position to the user on a map on the user's terminal to help him/her find his/her way about; or providing location-dependent services, e.g. the user is only permitted to perform a certain action such as controlling the lighting or heating heating or making a location dependent payment on condition of being detected to be within a certain predefined zone.

Or in yet further applications, other information may be mapped to the IDs such as location-based infotainment or advertising. Or as yet another possibility, information of interest could be embedded directly (explicitly) into the light rather than requiring a look-up.

SUMMARY

Consider now the case where a given luminaire comprises not just one, but multiple separate lamps, with a separate controller and separate coded light transmitter being included in each individual lamp within the luminaire. E.g. consider a luminaire for TLEDs which each individually include their own separate respective driver, controller, CL modulator and LEDs in the TLED. This scenario may occur for instance where the luminaire itself has not been designed from scratch or specially upgraded as a "smart" or "connected" luminaire which accommodates suitable lamps such as LED-based lamps, but rather where retrofittable versions of such lamps have been retrofitted into a traditional luminaire designed only for conventional "dumb" fluorescent tubes or filament bulbs. E.g. in typical office applications, four TLEDs may be included per luminaire. An instant-fit connected TLED based solution hence results in a four times higher number of wireless nodes than the competing approaches applying either a luminaire-renovation kit (for instance the Philips Evokit product) or a new coded-light luminaire.

The luminaire also typically includes a cavity where, with a number of TLEDs in a luminaire, the light from the different TLEDs will get mixed before leaving the TLED. E.g. this cavity is typically formed inside a diffuser casing of the luminaire. Now if all the TLEDs were to control themselves to emit coded light with a different ID, this would create an issue in that the coded light signals would be superimposed out of phase with one another. A similar issue could occur with any kind of retrofitted lamp, or any group of lamps having separate, independent coded light controllers and transmitters within a given luminaire. It would be advantageous to prevent this, e.g. so that retrofittable lamps in multi-lamp luminaires can be used for coded light transmission to enable applications such as indoor localization.

Hence according to one aspect of the present disclosure, there is provided a first lamp for use with one or more other lamps in a multi-lamp luminaire, each lamp being operable to emit respective illumination embedded with a predetermined coded light message; wherein the first lamp comprises: one or more light-emitting elements for emitting the respective illumination; a local controller; a communication interface configured to enable the local controller to communicate with a corresponding controller on each of the one or more other lamps in the multi-lamp luminaire, the communication comprising sending and/or receiving one or more signals; and a coded light transmitter operable to modulate the coded light message into the respective illumination of the first lamp; wherein the local controller is configured to coordinate with the corresponding controllers of the one or more other lamps, based on the communication via said communication interface, to prevent unsynchronized instances of said coded light message being transmitted from different ones of the lamps in the multi-lamp luminaire. There are at least two alternatives for this: either the lamps coordinate to select the same message and synchronize to transmit this at the same time, or else the lamps coordinate such that only one of them transmits the coded light.

Thus in embodiments, the local controller is configured such that said coordination comprises: coordinating that each of the first lamp and the one or more other lamps transmit a respective instance of the same coded light message, and synchronizing all the instances of said message to be transmitted starting at the same time. E.g. one lamp takes on the role of master based on a distributed protocol and this master lamp then decides on an ID, which it instructs the other lamps to use as well, and then causes the lamps to synchronize so as to align the transmissions in time.

For instance, the first lamp will typically comprise a mechanical connector for connecting to a complementary connector of the multi-lamp luminaire (preferably removably so), to connect the one or more light emitting elements to a power supply circuit of the multi-lamp luminaire in order to power the one or more light-emitting elements to emit the respective illumination. In embodiments, the first lamp may further comprise timing circuitry configured to use a cyclical variation in a voltage and/or current of the power supplied by the power supply circuit (e.g. by detecting zero crossings) in order to derive a clock signal common to the first lamp and the one or more other lamps, wherein the coded light transmitter is configured to synchronize the start of the respective instance of the coded light message to said clock signal, thereby synchronizing the start of the respective message to the start of the messages transmitted by the one or more other lamps.

In embodiments said timing circuitry may comprise a divider, wherein the coded light transmitter is configured to derive the clock via the divider so that the clock signal has a lower frequency than said cyclical variation in the power supply (preferably by a factor of at least eight, or at least sixteen, or at least thirty-two, or at least fifty, or even one-hundred or more, so as to convert a HF ballast frequency of the order of 20-100 kHz into a coded-light message re-transmission rate of the order of 1-8 kHz, or even hundreds or tens of Hertz).

In alternative embodiments, the local controller may be configured to select between operating the first lamp in a coded-light-transmission mode in which the coded light transmitter transmits said message and a no-coded-light-transmission mode in which the first lamp does not transmit any coded light message; and (as mentioned) the local controller may be configured such that said coordination comprises: coordinating that only one of the lamps in the multi-lamp luminaire transmits the message, and none other of the lamps in the multi-lamp luminaire transmit any coded light, such that if the first lamp is to transmit said message then the local controller selects to operate the first lamp in the coded-light-transmission mode, whereas if one of the other lamps is to transmit the message the local controller selects to operate the first lamp in the no-coded-light-transmission mode. I.e. all lamps in a luminaire agree on who transmits the coded light.

In particular embodiments of this, the local controller may be configured to select between operating the first lamp in a plurality of different substates of the coded-light-transmission mode, each substate modulating said message into the respective illumination with a different modulation depth; and the local controller may be further configured to detect what number of other lamps are present in the multi-lamp luminaire based on the communication via the communication interface, and to select between the different substates in dependence on the detected number. Thus advantageously, the overall modulation depth (as a proportion relative to the total emitted illumination from all the lamps in the luminaire) need not be compromised by the fact that only one lamp transmits the message. I.e. assuming all the lamps emit their respective illumination with the same intensity, but only one with the message modulated therein, then the transmitting lamp sets its modulation depth to a greater value (e.g. in terms of intensity) when within a luminaire along with a greater number of lamps, compared to the case when within a luminaire along with a lesser number (or even no) other lamps. E.g. if the transmitting lamp is in a luminaire along with m other non-transmitting lamps, it increases its modulation depth by a factor of m (e.g. in terms of intensity).

In further embodiments, the local controller may be configured to receive a dimming signal instructing the first lamp and the one or more other lamps to adjust the intensity of their respective illumination up or down; and the local controller may be further configured so as, in response to the dimming signal: to adjust the respective illumination emitted from the first lamp (up or down respectively) by a lesser proportion relative to the one or more other lamps on condition of the first lamp being in the coded-light-transmission mode, but to adjust the respective illumination (up or down respectively) by a greater proportion relative to the one of the other lamps transmitting the message on condition that the first lamp is in the no-coded-light-transmission mode. This advantageously preserves some headroom for the coded light modulation from the transmitting lamp.

By whatever means the coordination is achieved, in embodiments the communication interface may be configured to perform said communication via a constrained signalling channel whereby propagation of the one or more signals is constrained by a physical property of the luminaire, thereby limiting the one or more signals to being communicated between only those lamps in the same multi-lamp luminaire and not any other luminaire. That is, the fixture has a containing or confining effect on the signal, acting as a physical barrier or hindrance, and based on this it can be ensured that the signals are confined to lamps inside the same luminaire.

In particularly preferred embodiments, the constrained signalling channel comprises the power supply circuit (e.g. a ballast) powering the first lamp and the one or more other lamps, the communication interface being configured to perform said communication by modulating a current and/or voltage of the power supplied by said power supply circuit, the propagation of the one or more signals thereby being constrained to the power supply circuit within the same multi-lamp luminaire as the first lamp and the one or more other lamps. I.e. the constrained signalling channel may be achieved by signalling through a power supply circuit (e.g. ballast) incorporated within the luminaire, i.e. so said signalling medium is the power supply circuit of the luminaire, and said physical characteristic constraining the signal is the fact that the signal only travels through the local power supply circuit (e.g. ballast) within the luminaire and so is only conveyed to other lamps sharing the same power supply circuit. For example the transmitting circuit may be configured to perform said modulation by modulating a load placed on the power supply circuit by the first lamp. E.g. this modulation may comprise on-off keying, whereby the load is selectively shorted, or selective switched in and out of the power supply circuit. In embodiments the power supply used for the signalling is a ballast.

Alternatively however, the constrained signalling medium may comprise coded light, ultrasound and/or radio, with the propagation of said one or more signals being constrained by at least part of a housing of the luminaire.

In embodiments, the first lamp may take the form of a retrofittable LED-based lamp for replacing a fluorescent tube.

According to another aspect disclosed herein, there is provided the multi-lamp luminaire comprising the first lamp according to any the embodiments set out above or elsewhere herein, and the one or more other lamps. In embodiments the one or more other lamps may be configured in the same manner as the first lamp (in terms of any one or more of the embodiments set out above or elsewhere herein).

In embodiments, the luminaire comprises a shared optical cavity in which the first lamp and the one or more other lamps are housed. E.g. the optical cavity may be formed within a diffuser of the luminaire.

According to another aspect disclosed herein, there is provided a method of operating a group of lamps in a multi-lamp luminaire, each lamp being operable to emit respective illumination embedded with a predetermined coded light message, and each comprising a respective local controller; wherein the method comprises: communicating between the local controllers of the lamps within the multi-lamp luminaire in order to coordinate that unsynchronized instances of said coded light message are not transmitted from different ones of the lamps in the multi-lamp luminaire.

According to another aspect disclosed herein, there is provided a computer program product embodied on a computer-readable storage medium and configured so as when run on the local controller of the first lamp to perform the operations of the local controller.

In embodiments, any of the first lamp, luminaire, method and/or computer program may further comprise features in accordance with any of the teachings herein.

BRIEF DESCRIPTION OF THE DRAWINGS

To assist understanding of the present disclosure and to show how embodiments may be put into effect, reference is made by way of example to the accompanying drawing in which.

DETAILED DESCRIPTION OF EMBODIMENTS

The following describes some exemplary embodiments for implementing VLC for TLED based multi-lamp luminaries. As the two (or more) TLED tubes are within a shared optical compartment, the light output from the two tubes is mixed. In such a scenario, then without further measures being taken, the VLC pulses from the different TLED tubes would be erroneously concatenated; consequently the coded light detection scheme cannot extract the correct VLC signals.

Embodiments disclosed herein provide a mechanism that sets a single coded light ID for all TLEDs (or more generally lamps) within a luminaire and synchronizes the coded light emissions of the different tubes or lamps. Or alternatively, embodiments provide a mechanism that negotiates for only a single one of the lamps in the luminaire to emit a coded light ID. Either way, unsynchronized coded light transmissions are thus avoided. In embodiments, the coordination between lamps is achieved by communicating with one another via a communication channel that is constrained by a physical feature of luminaire, e.g. by signalling via the luminaire's ballast, such that the communication can be assumed to be confined to only those lamps within the same luminaire.

System Overview

Figure 1:
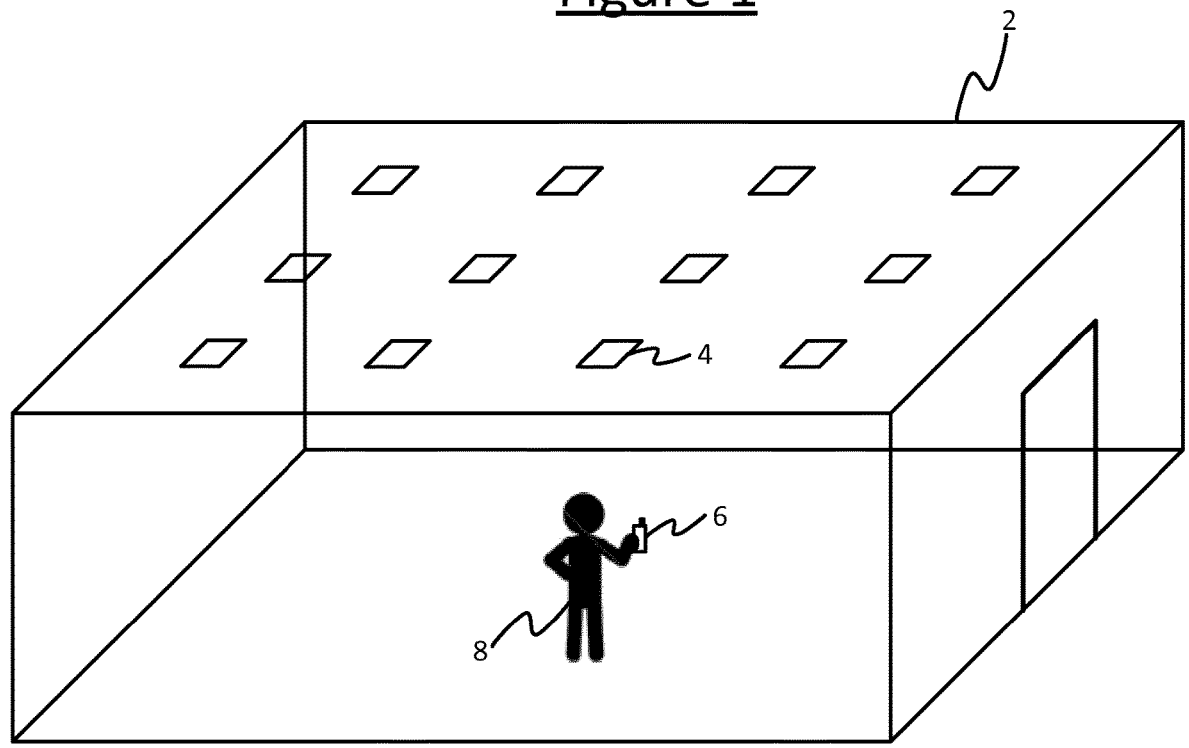
FIG. 1 is a schematic illustration of an environment in which a lighting system is deployed.

FIG. 1 illustrates an example lighting system in which the disclosed techniques may be implemented. The system comprises one or more luminaires 4 installed or otherwise deployed in an environment 2, arranged to emit illumination in into that environment 2. The environment 2 may be an indoor space such as one or more rooms and/or corridors of a building; or an outdoor space such as a park, garden, road, or outdoor parking area; or a partially covered space such as a stadium, structured parking facility or gazebo; or any other space such as an interior of a ship, train or other vehicle; or any combination of such possibilities.

Each of the luminaires 4 comprises at least one respective lamp such as an LED-based lamp, filament bulb or high intensity discharge (HID) lamp, plus any associated support, casing or other such housing. Each of the luminaires 4 may take any suitable form such as a ceiling or wall mounted luminaire, a free standing luminaire, a wall washer, a chandelier; or a less conventional form such as embedded lighting built into an item of furniture, a building material such as glass or concrete, or any other surface. In general a luminaire 4 may be any type of illumination device for emitting illumination into the environment 2. In embodiments the luminaire 4 is one which is designed to emit illumination suitable for illuminating an environment 2, i.e. functional lighting—a device designed and used to allow users to see and find their way about within the environment 2, providing or substantially contributing to the illumination on a scale adequate for that purpose. Nonetheless, instead of providing functional lighting (or as well as providing functional lighting), it is also possible that the luminaire 4 is a device designed to generate a lighting effect, such as task lighting, accent lighting or mood lighting; e.g. an embedded luminaire embedded in a surface which changes colour.

Figure 2:
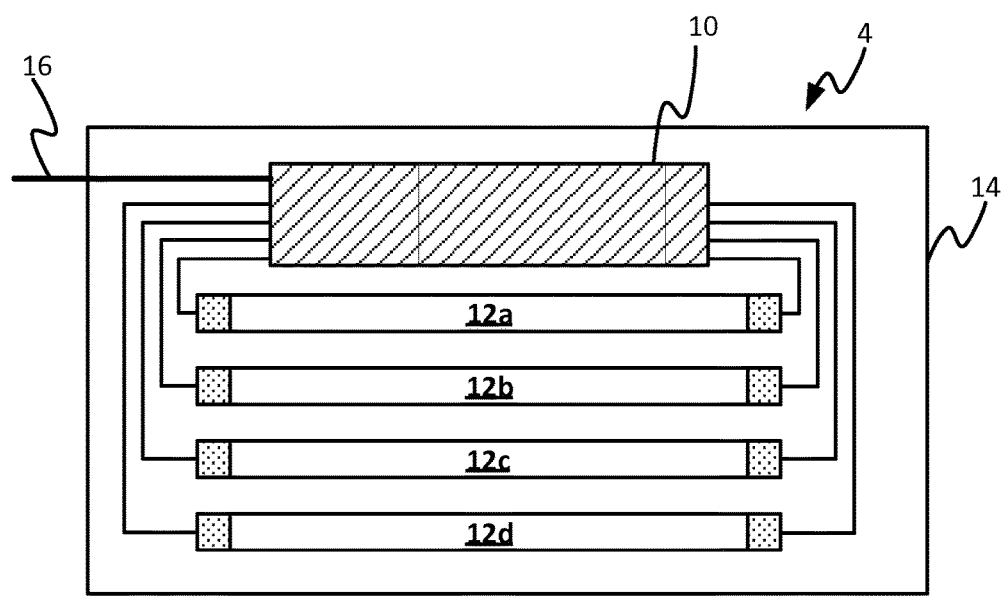
FIG. 2 is a schematic illustration of a luminaire comprising multiple lamps.

An example of one of the luminaires 4 is shown in FIG. 2. Each luminaire 4 comprises a power supply circuit 10, one or more lamps 12, and a housing 14. In fact, at least one of the luminaires 4, and in embodiments some or all of the luminaires 4, each comprise a plurality lamps 12. In this case, the luminaire 4 comprises an internal power supply circuit 10 of the luminaire, and sockets for connecting a plurality of lamps 12 to the power supply circuit 10 in order to power those lamps 12. E.g. by way of example, FIG. 2 shows four lamps 12a, 12b, 12c, 12d in the same luminaire 4 (but note that while the following embodiments may be descried in terms of this example, this is not limiting and the luminaire 4 may support other numbers of lamps 12). Being in the same luminaire 4 herein means the lamps in question share the same power supply circuit 10 and the same housing 14. Hence the lamps 12a-d may be described as "cohabiting" in the same luminaire 4. In general the "housing" 14 may refer to any casing and/or supporting structure of the fixture. E.g. in embodiments the housing 14 may comprise an opaque upper and/or side-wall casing for mounting on the ceiling, plus a plurality of sockets mechanically connected to the upper casing, and a lower diffuser element for diffusing the illumination emitted downwards by the lamps 12a-d into the environment 2. In another example form however, the "housing" 14 may take the form of a hanging structure such as a chandelier style structure supporting a plurality of sockets (and the casing element is not necessarily present).

The power supply circuit 10 connects to an upstream power supply 16, e.g. the mains supply, and is configured to generate a power supply suitable for powering the lamps 12 based on this. E.g. typically the power supply circuit 10 takes the form of a ballast, i.e. a device for limiting the current supplied to the lamps in its luminaire 4.

In embodiments, one or more of the luminaries 4 may each take the form of a fluorescent luminaire having sockets for accepting a plurality of fluorescent tubes (i.e. traditional gas-discharge tubes). In this case, the lamps 12a-d may take the form of "tube LEDs" (TLEDs), i.e. retrofittable LED-based lamps designed to replace the fluorescent tubes in a conventional fluorescent luminaire designed for traditional fluorescent tubes. For instance, most office luminaires take two to four TLED tubes per fixture (though it is not excluded that some, but not all, others of the luminaires may have only a single TLED).

Table 1 shows an overview of the typical number of TLED tubes 12 and ballasts 10 per luminaire 4 for the EMEA (Europe, Middle East and Africa) and NAM (North American) regions. In almost all situations, only one ballast 10 is present per luminaire 4. In the USA, TLEDs 12a-d within the same fixture are generally connected to single fluorescent ballast 10.

| Region | Luminaire type | Number of TLED tubes | Number of ballasts |
|---|---|---|---|
| EMEA | 2 ft × 2 ft square luminaire | 4 | 1 |
|  | 5 ft 1-lamp luminaire | 1 | 1 |
|  | 5 ft 2-lamp luminaire | 2 | 1 (or in some rare cases 2) |
|  | 4 ft 1-lamp luminaire | 1 | 1 |
|  | 4 ft 2-lamp luminaire | 2 | 1 |
| NAM | 2 ft × 2 ft troffer | 4 | 1 |
|  | 2 ft × 4 ft troffer | 4 or 3 | 1 |

Figure 3:
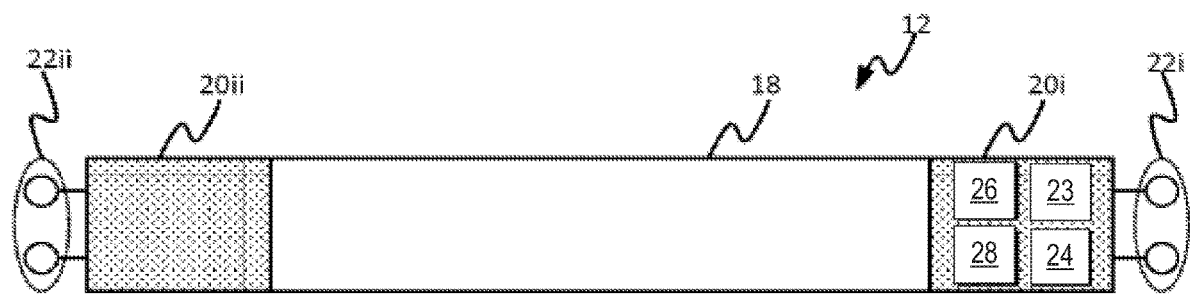
FIG. 3 is a schematic block diagram of a lamp.

FIG. 3 illustrates an individual TLED lamp 12, which may represent any of the lamps 12a-d used in the luminaire 4 described in relation to FIG. 2.

As shown, the lamp 12 comprises an actual lighting element or elements 18, such as a string or other array of LEDs. The lamp 12 also comprises at least one end-cap 20, and in the case of a TLED replacing a fluorescent tube, the lamp 12 in fact comprises two end-caps 20i, 20ii. Each end-cap 20i, 20ii comprises a respective connector 22 for connecting the lamp 12 to the ballast 10 via a socket of the luminaire 4, and thereby connecting the lighting element 18 to the power supplied by the ballast 10. In the case of a fluorescent tube, each connector 22 in fact comprises two terminals (a pair of pins) being either terminal of a receptive filament, though in the case of a TLED replacing a fluorescent tube, the two terminals of each connector are typically shorted together for instant start fixtures where there is no filament heating (but for programmed start fixtures there needs to be some impedance between the two pins).

Moreover, at least one end-cap 20i of the lamp 12 is used to house additional components, being components specific to the fact that the lamp 12 is a coded-light emitting, wirelessly controlled and/or LED-based replacement for a more traditional lamp such as a fluorescent tube or filament bulb. These additional components comprise a rectifier 23 and LED driver 24 for converting the power supplied by the ballast 10 (designed for powering a conventional lamp such as a fluorescent tube) into power suitable for driving an LED-based lighting element 18. The rectifier 23 is connected to the connector(s) 22i, 22ii of the lamp 12, for receiving the AC power supplied by the ballast 10 and converting it to DC. The LED driver 24 is connected to the rectifier 23 and arranged to further convert this into an approximately constant (but in embodiments adjustable) current supply for powering the LED-based lighting element 18 (e.g. LED string), and thereby cause a desired light output to be emitted from the lighting element 18. N.B. if the power supplied by the luminaire's power supply circuit 10 is already DC, the rectifier 23 is not needed, but typically in the scenario of a retrofittable LED-based lamp, the power from the luminaire's own power supply circuit (e.g. ballast) 10 will indeed be AC and therefore need rectifying.

Further, the additional components in the end-cap 20*i* comprise a controller 26, and optionally a wireless interface 28 in the form of a radio transceiver, such as a ZigBee, Wi-Fi, 802.15.4 or Bluetooth transceiver. The controller 26 may be implemented in software stored in an embedded memory of the lamp 12 and run on an embedded processing device 46 of the lamp 12, or the controller 26 may be implemented in dedicated hardware circuitry, or configurable or reconfigurable hardware circuitry such as a PGA or FPGA. In embodiments the controller is implemented in a combination of software and dedicated hardware M1 (see FIG. 7, to be discussed in more detail later).

In embodiments, to aid installation for best communication between lamps 12 within a luminaire 4, the end-cap 20*i* housing the additional components may be marked with a physical (e.g. visible) mark or marks. For instance, a physical mark may be provided at the end where the radio is, and the installer may be instructed to group the marks within a luminaire. Alternatively colour coding could be used, with a mark of one colour at one end 20*i* and a mark of another colour at the other end 20*ii*. E.g. a red dot on one cap (and optionally a blue dot on the other cap), and instructions may be provided that caps of the same colour go together.

The controller 26 is connected to the wireless interface 28 and the LED driver 24. The controller 26 is configured (e.g. programmed) to use the wireless interface 28 to receive lighting control commands from a manual or automated lighting controller (not shown), such as a dedicated remote control device, a wireless wall switch or wall panel, or a lighting control application running on a user terminal like a smartphone, tablet, laptop computer or desktop computer. In response, the controller 26 then controls the driver 24 in order to control the light output of the lighting element 18 in accordance with the received control command. For example this may comprise turning the light on or off, dimming the light output up or down, changing the colour of the light output, or creating a dynamic (time-varying) lighting effect. E.g. the controller 26 can adjust the current level supplied to the LEDs in the lighting element 18 in order to dim the light output, and/or can adjust the current level supplied to differently coloured ones or subarrays of the LEDs in the lighting element 18 in order to adjust the overall colour of the light output.

Alternatively or additionally, in a distributed system, each of the luminaires 4 may comprise one or more sensors such as an ambient light sensor and/or occupancy sensor (not shown), and/or one or more wireless sensors may be placed elsewhere in the environment 2. In this case the controller 26 may be configured to use the wireless interface 28 to receive sensor readings from one or more of the sensors, e.g. in the same luminaire 4 and/or a neighbouring luminaire 4. In response, the controller 26 can then control the light output of the lighting element 18 in accordance with the sensor reading(s), e.g. to dim down or turn off the lights when a sensor on detects that the ambient light level is beyond a threshold or that no occupant is present within a predetermined vicinity, or to dim up or turn on the lights when a sensor detects that the ambient light level is below a threshold or that an occupant is present in the vicinity (or more generally the control may be based on a more complex distributed control algorithm that computes an adjustment based on the sensor readings from multiple sensors).

In further embodiments, the controller 26 may also be configured to use the wireless interface 28 to send status reports to the lighting controller (not shown), e.g. to report burning hours to date, to report an operating temperature of the lamp, and/or to report a fault.

However, to be able to perform the various activities discussed above, or such like, this first requires the lamps 12 to be commissioned. That is, the lamps 12 need to be identified and joined to a wireless network such as a ZigBee, Wi-Fi, 802.15.4 or Bluetooth network. This wireless network then provides the means by which the wireless interface 28 on each lamp 12 can subsequently, in the operational phase, receive lighting control commands from the lighting controller (not shown), receive sensor readings from the sensor(s), and/or send status reports to the lighting controller. The following will be described in terms of ZigBee, but it will be appreciated that this is not necessarily limiting.

Preventing Unsynchronized Transmission

It would be desirable to also include coded-light functionality into a retrofittable LED-based lamp such as a TLED or the like, e.g. in order to enable indoor positioning applications for food and large retail businesses based upon coded-light instant-fit TLEDs. By leveraging instant-fit TLEDs or other such retrofit lamps for coded light applications such as indoor positioning, this advantageously allows faster upgrading of a lighting system to include coded-light functionality, through re-lamping rather than replacing or renovating the luminaires 4 themselves. Embodiments below may be described in terms of TLEDs by way of example, but it will be appreciated that similar teachings can apply to other retrofittable LED-based lamps (e.g. replacements for filament bulbs) or to coded-light emitting lamps in general.

In embodiments, it would be desirable to provide TLED products which emit a fixed factory-set VLC code that is unique to the luminaire in which the TLED is installed. The attractiveness of the VLC TLED is the high cost competitiveness of the underlying TLED platform, both with respect to component cost and ease of installation. Adding coded light functionality to a non-smart TLED leads to a rather limited cost uplift—around 10% extra BOM (bill of materials) cost; which is low in comparison to the potential value generated by indoor localization retail applications. Optionally, a coded light version of ZigBee-based wireless TLEDs may also be attractive, e.g. to as enabler for easier commissioning.

Coded light TLEDs emitting VLC codes work well if applied in installations with only single-tube luminaires, such as a bare batten light. However, if two TLEDs were to be placed within a shared optical compartment, then the light from the two tubes would be be mixed. As the VLC pulses from the different tubes will be erroneously concatenated, the coded light detection scheme cannot extract the VLC signals of the tubes. Again, similar comments may also apply in relation to other types of coded-light emitting lamp.

To address this issue, embodiments of the present disclosure provide a mechanism which groups all the tubes within the same optical chamber (preferably auto-grouping them) and then automatically synchronizes their coded light patterns. For instance, the process may be as follows:

I) determine which lamps 12 are within the same luminaire 4 (either automatically based on determining spatial proximity, or by other means such as via a commissioning tool, e.g. a ZigBee or NFC—near-field communication—configuration tool);

II) assign the same coded light ID for both (or all) of the lamps 12a-12d found to be within the same luminaire 4 (e.g. via a commissioning tool such as a ZigBee or NFC tool); and III) synchronize the coded light emission patterns of the lamps 12a-12d by communicating between the lamps in the same luminaire. Alternatively the lamps 12a-12d may negotiate such that only one of them emits coded light and the others emit only uncoded illumination.

In embodiments, spatial proximity of the lamps is detected by measurement of received signal strength or time-of-flight of a signal emitted from one TLED and detected by another. The signal used to determine spatial proximity can be a visible light, invisible light, radio, heat, audio or ultrasound signal. Or in a variant of this, the spatial proximity may be detected by sending out a signal from at least one of the lamps 12a over a "constrained signalling channel" whereby propagation of the signal is constrained by a physical property of the luminaire 4, such that it is received only by those other lamps 12b-12d found in the same luminaire. This way the lamps 12 can detect which other lamps they share a luminaire 4 with.

In embodiments, the (or a) constrained signalling channel may also be used to perform the communications between lamps 12a-12d within the luminaire 4 required to coordinate with one another to ensure that they emit the same code at the same time, or that only one of the lamps in the luminaire 4 emits a code.

Figure 11:
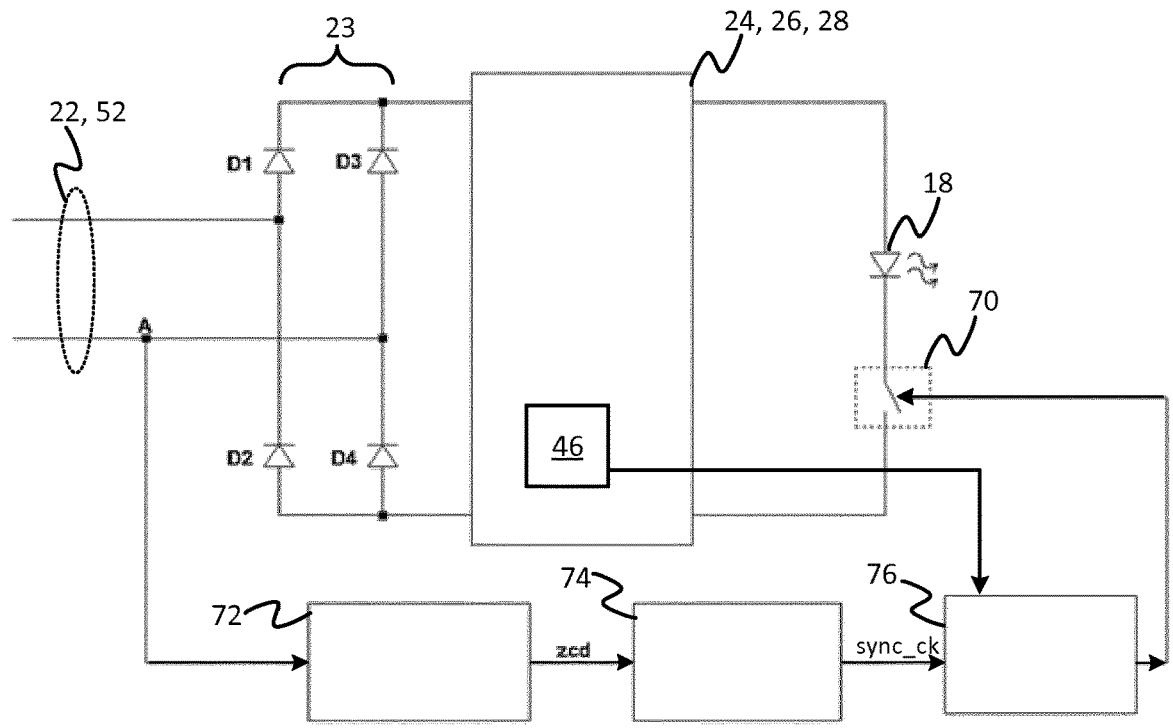
FIG. 11 is a schematic circuit diagram of a lamp with a zero crossing detection circuit and coded light synchronization.

FIG. 11 illustrates an example TLED circuit in accordance with embodiments disclosed herein. In addition to the components already described in relation to FIG. 3 (and described later in relation to FIG. 7), the circuit comprises a coded light modulator 76 and modulator switch 70, and optionally a zero-crossings detector 72 and a divider 74 in the form of a counter. The modulation switch is coupled to the one or more lighting elements (in this case LEDs) 18, e.g. in series with them. The coded light modulator 76 is coupled to the modulation switch 70 and arranged to switch the modulation switch 70, in order to thereby modulate a property such as the intensity of the the illumination emitted by the one or more lighting elements 18. The microcontroller 46 is coupled to the coded light modulator 76 and configured to control it to modulate the illumination emitted by the one or more lighting elements 18 via the modulation switch 70. Particularly, the microcontroller 46 is configured to control the modulator 76 to modulate the illumination in order to embed a message (i.e. data or a signal) into the illumination, e.g. a code which is to act as an ID of the luminaire 4.

Note that although an on-off switch is shown in FIG. 11 for schematic purposes, in embodiments the modulation need not comprise switching the illumination between fully-on and fully-off, but rather between two non-zero levels such as, say, between +10% and −10% of the nominal intensity. Or in other embodiments, more than two levels may be used, or even a continuously variable modulation could be used. Various coded light encoding schemes will in themselves be known to a person skilled in the art and will not be repeated here at length.

In embodiments, the coded light modulator 76 is configured to derive a clock signal from the high frequency (HF) oscillations in the voltage and/or current supplied to the lamp 12 by the ballast 10, and to time the transmission of the coded light message according to this clock signal. To do this, in embodiments a zero-crossing detector 72 is coupled to one of the input lines 22 connecting to the ballast 10, and is configured to output a positive assertion (logical true signal) each time a zero-crossing is detected in the sinusoidally varying voltage or current supplied on this line 22i/ii from the ballast 10. Preferably the output of the zero-crossing detector 72 is coupled to the input of a divider 74 comprising a counter. In this case the counter 74 is clocked each time a positive assertion is output from the zero-crossing detector 72. The counter 74 has a certain predetermined numerical counter length—e.g. if it is a four bit counter it has length sixteen, i.e. it cycles through sixteen counter values from zero to fifteen. Every time the counter 74 cycles around this number of counts, it outputs a positive assertion (logical true signal) to the coded light modulator 76. Thus the counter 74 divides the frequency of the signal output from the zero-crossing detector 72 (which equals twice the HF frequency of the ballast) by a predetermined number such as sixteen. The coded light modulator 76 may be configured to transmit the coded light message repeatedly triggered by the output of the divider 74, i.e. once per positive assertion from the divider 74 (once per logic true). Note: although described here in terms of the ballast 10 of TLED, the same principle can apply to any lamp having a cyclical or periodic component to its power supply.

In a first category of embodiments, the microcontrollers 46 on the different lamps 12a-12d are configured to coordinate with one another in order to synchronize the coded light emissions of the lamps 12a-12d. In particular embodiments, the communication involved in doing this may be achieved by communicating via a "constrained signalling channel". That is, a communication channel constrained by physical feature of the luminaire such that propagation of the signal is limited by a physical property of the luminaire. Thus the signal is only received by those lamps 12a-d within the same luminaire 4 and not other lamps 12 that may be present in the environment outside the luminaire 4 in question. For instance this may be achieved by means of a signal modulated into a voltage and/or current of a power supply circuit 10 powering the respective group of lamps 12a-12d in the respective luminaire 4 (e.g. via load variations of the ballast 10). As another example, the constrained channel could be implemented by signalling using coded light, radio or ultrasound, with at least a part of the housing of the luminaire 4 being arranged as a shield to block propagation of the signal outside of the luminaire 4. Details of examples for implementing a constrained signalling channel will be discussed in more detail later.

Thus if a lamp 12 (or rather its microcontroller 46) sends out a signal over this channel then it can assume that only the other lamps in the same luminaire will receive them. Similarly if a signal is received by a lamp 12 over such a channel, it can assume this cane from another lamp in the same luminaire 4. Thus, by communicating over such a channel, it is possible for lamps 12 to detect which other lamps are their compatriots in the same luminaire 4. For example a lamp 12 may be configured to detect an adjacent lamp component by receiving a signal from that component over the constrained channel upon commissioning, or in response to detecting a new lamp when an old lamp is replaced at a later stage after commissioning.

Furthermore, in embodiments, the lamps 12 (or rather their respective microcontrollers 46) are arranged to communicate with one another over a channel of this kind in order to perform the required coordination between the lamps 12a-12d in the same luminaire 4 to ensure they all emit the same coded light message. The HF output of the legacy fluorescent ballast 10 can then be used to derive a synchronization clock signal, e.g. based on the technique described above. As only the lamps connected to the same fluorescent ballast 10 are exposed to this ballast's power output, this means they all derive the same synchronization clock signal with the same time alignment, and so are each triggered to transmit their respective instance of the coded light message at the same time. According to one implementation of this, as mentioned, a zero-crossing detector 72 may be arranged to detect the zero crossings of the high frequency output of the fluorescent ballast 10, and a counter 74 may be used to reduce the frequency of the synchronization signal (e.g. by dividing the HF oscillations by an integer).

As an alternative variant of this, the synchronization may be achieved by signalling from one lamp 12a to the others 12b-d over the (or a) constrained signalling channel, e.g. again via modulation of a voltage and/or current of the power supply circuit 10. In this case, the controller 46 on one master lamp (e.g. 12a) is configured to actively send a synchronization signal to the other lamps 12b-12d in the luminaire, which indicates the timing used by the master lamp 12a to transmit its respective instance of the coded light message, and which the other lamps 12b-d (or rather their controllers 46) use to time the transmission of their respective instances of the message to coincide with the transmission of the message from the master lamp 12a.

Note also: while preferred embodiments use the constrained signalling channel to both detect which lamps are in the same luminaire and to perform the communications involved in coordinating between them, this is not essential in all possible embodiments. Alternatively for example, the constrained signalling channel may only be used initially at commissioning to detect which lamps 12 are in the same luminaire 4, and then based on this, as part of the commissioning process, the addresses of those lamps within an RF wireless network such as a Wi-Fi or ZigBee network may be determined. The addresses may then be stored at location that each lamp 12 has access to, along with an indication that the lamps with those addresses share a luminaire (e.g. each lamp stores locally in its own embedded memory the addresses of each of the other lamps, or the addresses are stored centrally in a lamp-to-luminaire mapping database at a location such as a server accessible to each of the lamps 12). Then, once the network addresses are known and stored, microcontrollers 46 on the the lamps 12 in the same luminaire 4 can use these to communicate with one another over the RF network, e.g. the Wi-fi or ZigBee network, via the respective the wireless interfaces 28.

Or as a further alternative, the constrained signalling channel need not be used at all. For example, the proximity between lamps may be detected by emitting a wireless signal from at least one of the lamps (e.g. 12a) and then measuring a distance-dependent property such as received signal strength or time-of-flight of the signal as received at each other lamp 12 within range of the signal. E.g. this could be an RF, ultrasound, visible light, infrared or ultraviolet signal. Based on predetermined knowledge of the distance between lamps in a luminaire 4, then the lamps' controllers 46 or a commissioning tool, or the commissioning technician, can determine which lamps 12a-12d are found within the same luminaire 4 and store the addresses of these. As yet another possibility, which lamps 12 share a luminaire could be detected based on a near-field communication (NFC) technology embedded in each lamp 12, or could be determined manually by the commissioning technician.

A step-by-step description of a preferred embodiment now follows.

The first step is to identify one master lamp within the same fixture 4. This can be achieved in a number of ways, e.g. by means of an installer action via NFC, or by means of an automated process such as via a constrained signalling channel. In embodiments, each given lamp 12 is capable of operating in either master or slave mode. In master mode the lamp 12 generates the synchronization and optionally the coded light ID, whereas in the slave mode the lamp 12 receives the sync signal and the ID from the master.

In embodiments, the microcontrollers 46 on the lamps 12 are configured to operate according to a distributed protocol to determine which of them becomes the master and which are slaves. The selection may be made once at commissioning, or in an ongoing fashion, e.g. periodically or in response to a certain event such as an old lamp within the luminaire 4 being replaced by a new lamp.

In embodiments, the distributed protocol may involve negotiating between the microcontrollers 46 on the different lamps 12a-12d. In embodiments this negotiation may be conducted via the constrained signalling channel (e.g. by signalling via the ballast 10), such that the lamps 12 know they are negotiating between only their neighbours in the same luminaire 4. Alternatively the negotiation may be conducted via other means such as via a wireless RF network and wireless interfaces 28 if the addresses of the lamps 12a-12d within the same luminaire 4 are known to one another (or rather their microcontrollers 46). In some particular embodiments, determining which lamp 12 is the master may involve a respective random delay before each lamp 12 starts signalling; until the point that the random delay period is over, the microcontroller 46 on each given lamp 12 has to listen to signals from the other lamps in the same luminaire 4, and the first to signal becomes the master. The lamps 12 may follow the ALOHA protocol for collision avoidance. A particular example protocol for selecting which lamp 12 within a luminaire 4 is to become master and which slaves will be described in more detail later. However, this is not limiting and in general the skilled person will be aware of other suitable distributed master-slave protocols by which a group of components can determine which of them is to be a master and which are to become slaves to the master.

The following will be described as if a first lamp 12a has been selected to become the master and the one or more other lamps 12b-d have been selected to become slaves. However it will be appreciated that this is only by way of illustration: in embodiments, each lamp 12a-d is configured identically when fresh "out of the box", and each may have an equal chance of becoming master.

As a second step after selecting the master, the master lamp 12a will initiate synchronization (e.g. after power up). In addition to synchronizing the coded light emission, the master 12a may optionally set a single coded light ID to be emitted by all the lamps 12a-d within the luminaire 4. In embodiments, each of these actions is preferably achieved by signalling from the microcontroller 46 of the master 12a to the respective microcontrollers 46 of the slaves 12b-d over the constrained signalling channel, such as by modulating a signal into the shared power supply, e.g. via the ballast 10. Alternatively however this could be via other means such as via a wireless RF network and wireless interfaces 28 if the addresses of the lamps 12a-12d within the same luminaire 4 are known to one another.

Figure 12:
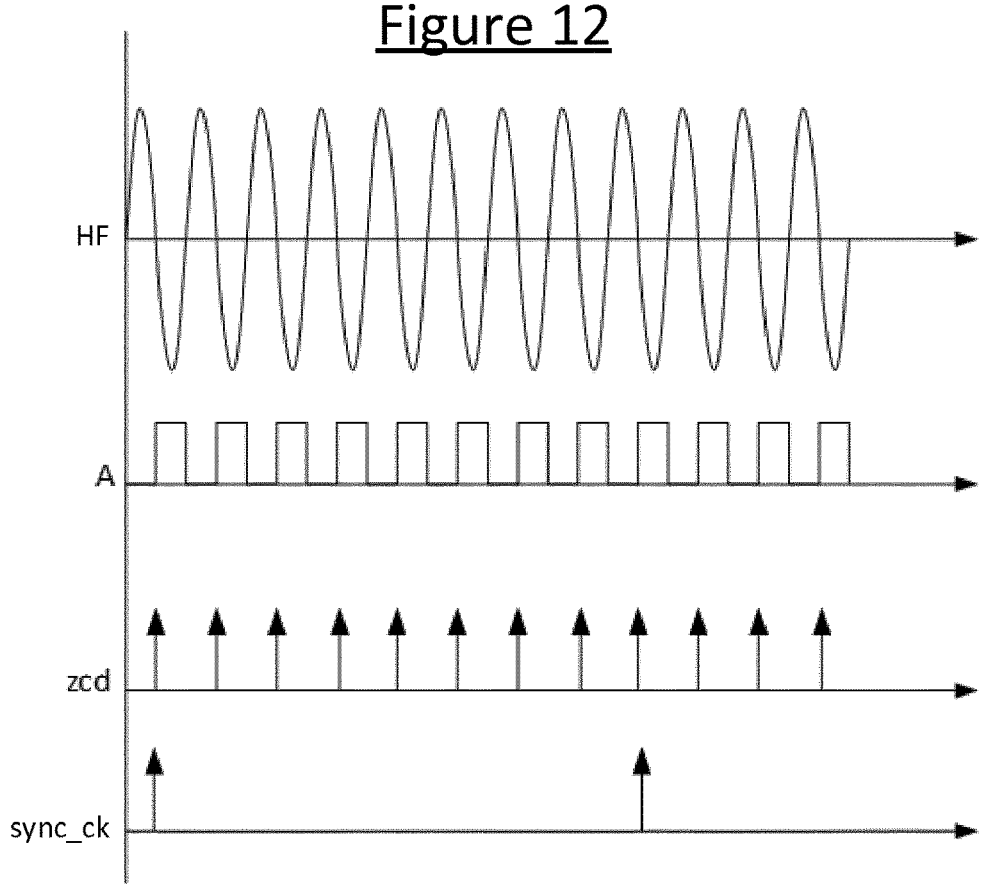
FIG. 12 is a schematic timing diagram illustrating the derivation of a clock signal from an HF ballast.

As a third step, each of the master 12a and slave lamps 12a-12d use the HF output of the ballast 10 as a clock signal to ensure that the VLC signal of the lamps 12a-12d remain synchronized over time. This is illustrated in FIGS. 11 and 12.

As shown, the input of the zero-crossing detector 72 of a each lamp 12 is coupled to point A at one of the respective power input lines from the ballast 10. The zero-crossing detector 72 detects zero-crossings in the HF power supply by sensing the voltage at the input rectifier of the lamps 12. This detected signal from A is close to a square wave, but the zero-crossing detector is also configured to convert edges of the square wave into pulses, labelled "zcd" in FIG. 12.

However, a typical HF ballast output frequency is between 20 kHz to 100 kHz. This frequency is too high for simple coded light applications. To address this a counter 74 is arranged to generate a lower frequency stream of pulses "sync_ck" based on the HF signal. That is, the zcd signal pulses are used as input clock signal of the counter 74, which clocks the counter 74 to increment by one with each input pulse, up to a predetermined upper value, after which the counter 74 resets and starts counting again from a predetermined lower value, typically from zero (or equivalently the counter could count down from the upper t the lower value). The counter 74 is configured to generate a pulse at its output every time it cycles around between the upper and lower values, thus generating a sequence of pulses at a lower frequency than those supplied by the zero-crossing detector 72.

The output of the counter 74 is used as a synchronization clock signal for the VLC modulator 76. Suppose for example the counter is a m bit counter. Then the frequency of the sync signal is the ballast output frequency divided by 2^m. For a reliable operation of the VLC the sync signal should preferably be of the order of tens of Hertz. As an example implementation, embodiments may use a 2 KHz symbol clock, with 24 bits being continuously repeated, consisting of 16 bit data and 8 bit CRC. Hence each message takes 35 ms (about the frame time of a smartphone camera).

Whenever the coded light modulator 76 on each of the master and slave lamps 12a-12d detects a pulse from the output of the counter 74, it is triggered to emit an instance of the coded light message allocated by the master lamp 12a. Thus the start of each instance is aligned with the others in time. Further, as each microcontroller on each of the slave lamps is instructed by the master to transmit the same message (e.g. same ID code), then each emitted instance of the message from each of the master and slave lamps 12a-12d is the same, each being of the same length and each comprising the the same sequence of the same symbols (e.g. bits). The modulation switch 70 modulates the LED current and therefore the light generated by the lamp 12. Thus by having all the lamps connected to the same ballast uses the same HF signal to generate the sync signal for VLC, it is possible to make use of the HF input signal from the ballast as a means for keeping the the coded light messages from lamps 12 such as TLEDs synchronized.

Figure 10A:
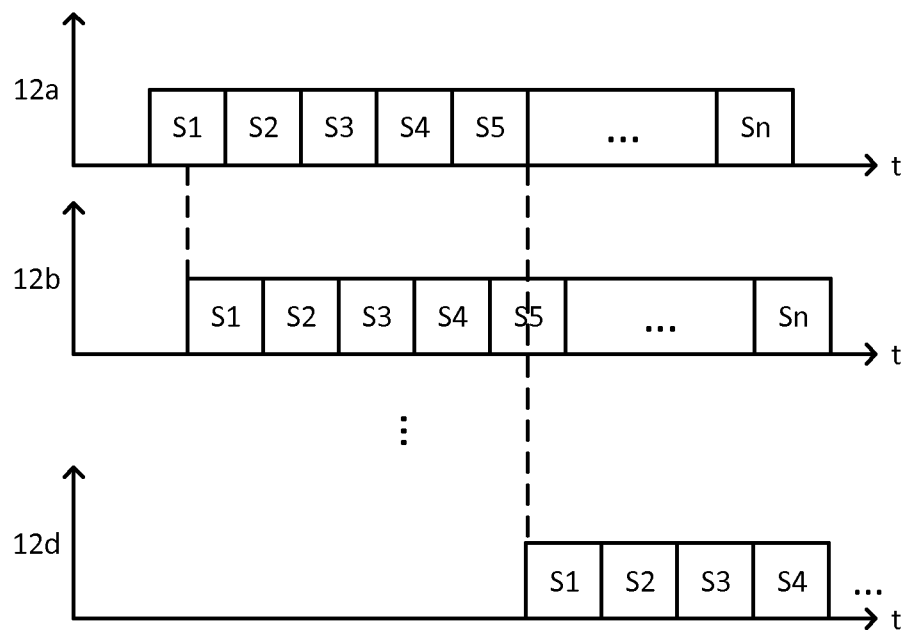
FIG. 10a is a timing diagram showing transmission of coded light messages from multiple lamps in an unsynchronized manner.
Figure 10B:
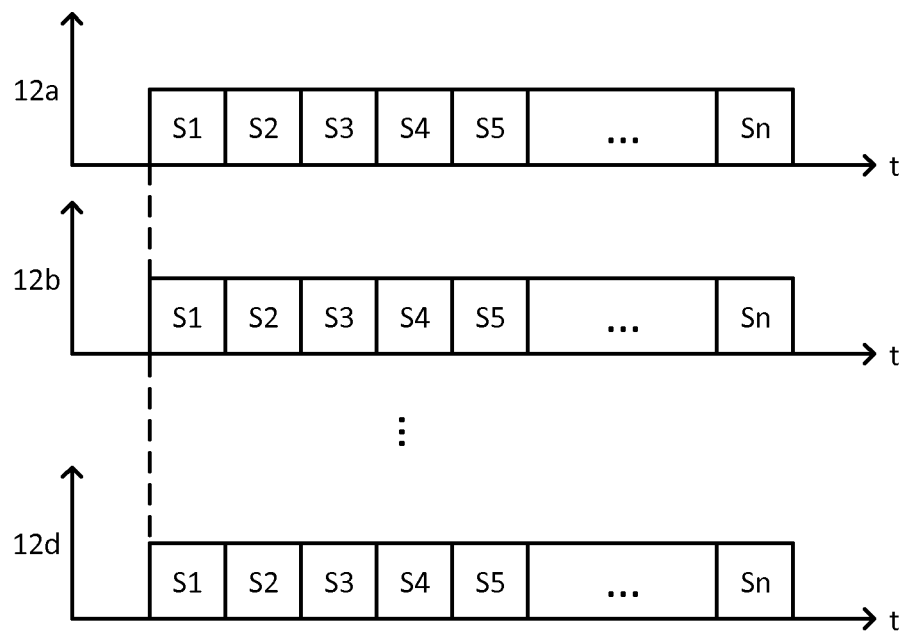
FIG. 10b is a timing diagram showing transmission of coded light messages from multiple lamps in a synchronized manner.

This is illustrated in FIG. 10b, in contrast to FIG. 10a which shows an unsynchronized case. Without the synchronization, then even if the lamps 12a-12d were arranged to emit the same code (which may not be guaranteed either), the instances of the code from the different lamps 12a-12d would all be transmitted starting at different times. When the lamps 12a-12d are also in the same luminaire, sharing the same optical cavity (e.g. same diffuser), then the light carrying the code from the different lamps 12a-12d will become mixed together destructively and the code may therefore be difficult or even impossible for a coded light detector to detect and decode. However, with the synchronization as shown in FIG. 10b, the instances of the code add constructively and so detection is possible.

In an optional variant of the above, each of the lamps 12 may also be equipped with a crystal clock (not shown). However, the crystal clocks of lamps 12a-d such as TLED tubes drift with respect to one another. In embodiments the coded light modulator 76 in each lamp 12a-d may be arranged to clock the message transmission based on the crystal clock, but also to synchronize the coded light signals of the lamps 12a-d within the same luminaire 4 at regular intervals, e.g. every hour, based on signals exchanged over the constrained signalling channel between the respective microcontrollers 46.

In a second, alternative category of embodiments, the second step above may be omitted. In that case, after determining the master lamp 12a within the luminaire 4, then rather than synchronizing transmission from the multiple different lamps 12a-12d in the luminaire, instead only this master lamp 12a emits coded light while the slave lamps 12b-d emit just a constant illumination output without coded light. For example the master may explicitly instruct the slaves not to transmit coded light, or the slaves may be configured to implicitly understand that once they have determined they should enter the slave mode then they should not transmit coded light.

Again, in embodiments, the communication involved between master 12a and slaves 12b-d to impose this state of affairs may be conducted over the constrained signalling channel, e.g. by modulating a signal into the power supply shared by the lamps 10, such as via the ballast 10. Alternatively this communication could be conducted via other means such as via a wireless RF network and the respective wireless interfaces 28 if the addresses of the lamps 12a-12d within the same luminaire 4 are known to one another.

Note: in some embodiments of this second category, additional measures may be taken to ensure the illumination function of the luminaire 4 is not compromised by the fact that only one of the lamps 12a and not others 12b-d is transmitting the coded light message.

For instance, in embodiments the microcontroller 46 may be configured such that, when controlling the master lamp 12a to transmit coded light while the others are in the "no-emission" mode, then the microcontroller 46 will detect how many lamps 12a-12d are present in the same luminaire 4 and adapt the modulation depth of the coded light emitted by the master lamp 12a correspondingly (the modulation depth being the difference between the maximum and minimum modulated levels of the property being modulated to represent the symbols of the message, typically intensity, i.e. so the difference between the maximum and minimum intensity). That is, the master lamp 12a is configured to set its modulation depth to two, three, . . . , or k, times the single-lamp level if the number of lamps 12 in the luminaire 4 is two, three, . . . , or k respectively. The reason for this is that the modulation depth should preferably scale to keep it detectable amongst the amount of uncoded light being emitted by other lamps 12b-d in the luminaire 4. E.g. in the case of two TLEDs, the Master TLED will adjust its modulation depth to twice its normal or nominal value (twice the depth it would use if emitting alone) so that the total modulation depth of the combination of the master and slave TLEDs reaches the desired value for the application, and remains the same proportion of the total light level as if only one TLED was present emitting coded light at the normal or nominal value.

In alternative or additional embodiments, the microcontroller 46 may be configured such that its response to a dimming command is dependent on whether it is currently in the role of the master emitting the coded light message or a slave not emitting coded light (where the dimming command could come from a user input device such as a dimmer switch or lighting control app running on a user terminal, or from an automated lighting control means such as from a centralized buildings or lighting controller or from a local or remote sensor). Particularly, the microcontroller 46 is configured such that it dims its illumination output by a lesser degree if its lamp 12a is the master and by a greater degree if its lamp 12b-d is a slave, but such that the overall response to the dimming command from all the lamps 12 in the luminaire 4 combined is still in accordance with the dimming command (i.e. still dims up or down the total illumination by the amount specified by the dimming command). The reason for this is that, if there are k lamps being dimmed and the lamps are emitting coded light, then there is a risk that the headroom (per lamp) for coded light (amplitude) modulation becomes too low. To avoid this it may be desirable to coordinate the dimming amongst the lamps. So the lamps 12 (or rather their microcontrollers 46) might elect that one or two lamps dim less so as to keep the headroom for coded light emission and in order to compensate some of the others dim more. This is particularly relevant when the light is mixed through an element such as a diffuser prior to exit from the luminaire 4 (less so in the case where the lamps 12 are in plain sight).

In yet further alternative or additional embodiments, the microcontrollers 46 of the lamps 12 may be configured to provide an automatic fail over for the case that only one of the lamps 12a emits coded light and the other lamps 12b-d are set to "no emission". That is, the microcontrollers 46 on the other lamps 12b-d are configured to detect if the coded-light-emitting lamp 12a fails (e.g. detecting this via the constrained signalling channel or voia the RF wireless network), and if so, to operate such that one of the "no emission" lamps 12b-d starts to transmit coded light (using a negotiation or distributed protocol to determine which if there are more than two lamps in the luminaire, e.g. negotiating over the constrained signalling channel or RF wireless network). And if the broken lamp 12a gets replaced with a factory new lamp, no actions by a commissioning person are required.

Auto-Grouping & Master/Slave Roles

The following describes a commissioning method which, amongst other aspects, includes a distributed protocol for selecting which of the multiple lamps 12a-12d in a multi-lamp luminaire 4 is to act as master (or "leader") and which is to act as a slave (or "follower"). The described protocol for selecting master and slave—regardless of whether or not other features described below are brought along with it—may be used in order to determine which lamp 12 is to become the master for the purpose of deciding on the coded light ID (in embodiments where all the lamps 12 in the luminaire 4 emit the ID), or which is the master in the sense of which is to transmit the coded light message of the others (in embodiments where only one of the lamps 12 in the luminaire 4 emits the ID). The process of deciding who is to be the master may be performed during the commissioning phase, and/or in an ad-hoc manner after commissioning, e.g. periodically or triggered in response to the addition of a new lamp into the luminaire (re-lamping).

The following also describes an optional process by which it may be detected at commissioning which lamps 12a-d share the same luminaire 4, and for auto-grouping these lamps.

As mentioned, one type of connected lamp is an instant-fit "tube LED" (TLED) lamp which retrofits into a luminaire designed for traditional fluorescent tubes. According to the instant-fit TLED approach, the existing fixed-output fluorescent ballast, the TLED lamp-holders and also all the electrical wiring within the luminaire remain unchanged. Via straightforward re-lamping, existing "dumb" fluorescent tubes (or even "dumb" TLED tubes) can be exchanged with dimmable connected TLEDs each having an individual, integrated wireless radio.

However, a project to replace all the old-fashioned tubes in an office with TLEDs, or the like, will require a commissioning process.

Consider the process of commissioning an arrangement of wireless luminaires in which the wireless interface is included in each luminaire's housing on a per luminaire basis (as opposed to a wireless interface being included in each individual wireless lamp). To do this, the commissioning technician has to stand underneath each luminaire that he or she intends to commission (or in visible vicinity of it), and select what he or she believes to be that luminaire on the user interface of a commissioning tool (e.g. a dedicated commissioning device or a commissioning application running on a mobile user terminal such as a smartphone, tablet or laptop). The commissioning tool then broadcasts a commissioning request comprising an identifier of the selected luminaire, and in response the luminaire having that identifier will emit a visual indication (e.g. by blinking via its lamp(s) or a separate indicator light). This way the technician can check whether the selected luminaire is indeed the luminaire that he or she intends to commission. If so, the technician then confirms this to the commissioning tool, and in response the tool adds the confirmed luminaire to a wireless network for controlling the lights in a subsequent operational phase. The commissioning technician then repeats this for each luminaire to be commissioned (e.g. every luminaire in the office).

As alternative, sometimes also pointing methods are applied to identify a specific luminaire during the commissioning process. One example is an infrared remote control being directly pointed to the luminaire featuring an infrared receiver. Another method is to select a luminaire by shining a high-powered torchlight into the daylight sensor of a specific luminaire.

Consider now the case where a wireless interface is included in each individual wireless lamp. In typical office applications, four TLEDs are included per luminaire. An instant-fit connected TLED based solution hence results in a four times higher number of wireless nodes than the competing approaches applying either a wireless luminaire-renovation kit (for instance the Philips Evokit product) or a new wireless luminaire. Thus the present state-of-the-art solutions for connected TLEDs will result in a very high commissioning effort due to the very high number of wireless nodes per space. I.e. the commissioning technician would have to perform the above-described steps for each lamp, not just each luminaire, by standing under or in visual vicinity of each individual lamp and having it blink to confirm its identity, then individually joining each lamp to the control network. The commissioning technician may also have to identify which lamps are part of the same luminaire in order to allow them to be controlled (e.g. dimmed) as a group after commissioning phase is over. Further, such a process typically requires a relatively highly skilled commissioning technician.

The following provides an auto-commissioning method for auto-grouping of multiple connected TLED tubes, or other such wireless lamps, which are residing within the same luminaire. In embodiment, the auto-grouping method builds upon the insight that TLEDs residing within the luminaire are wired to one shared fluorescent ballast. To exploit this, a verification that TLEDs share the same ballast is performed via intentional load change patterns imprinted by one master TLED onto the ballast. The load change experienced by the fluorescent ballast—depending on the ballast type—results either in shifts of the ballast frequency and/or the lamp currents provided by the fluorescent ballast towards the other, slave TLEDs within the luminaire. Upon detection of the frequency or current shift patterns caused by the master TLED, each of the one or more slave TLEDs can conclude with certainty that it shares the same the same ballast and hence that it is within the luminaire with the master TLED.

The following disclosure also provides a network joining mechanism optimized for TLEDs. Initially only the Master Connected TLED is visible as Factory New lamp to the installer. Once the installer adds the Master TLED to the ZigBee network, which is set up by a lighting bridge or remote control, the slave TLEDs residing within the same luminaire are then enabled to join the same ZigBee network as well without any additional action being required from the installer. The disclosure further provides a "ballast-load-drop-based" auto-grouping method aimed at the replacement of broken connected TLEDs without requiring installer intervention.

To increase the speed of the TLED auto-grouping, preferably the procedure starts with a faster and less intrusive (but also less deterministic) evaluation method. That is, firstly the TLEDs within the same luminaire can be assumed to be likely to be within a relatively small "wireless" vicinity compared to the typical spacing to the nearest neighbour luminaire. Hence based upon radio RSSI (or alternatively coded light), the TLEDs may be grouped into buckets such as "likely within same luminaire", "maybe in same luminaire", "unlikely within same luminaire". Then, starting from the initial RSSI-based TLED buckets, the method proceeds to use the load modulation to determine with certainty which of the TLEDs are connected to a shared fluorescent ballast, and are therefore for sure located within the same luminaire.

In accordance with embodiments disclosed herein, the controller 26 is configured to participate in a commissioning process prior to the operational phase. The commissioning involves one or more of the lamps 12 interacting with a commissioning tool 6 used by a user 8 who is performing the commissioning. The commissioning tool 6 may take any suitable form, such as a dedicated remote unit, or a commissioning application running on a user terminal such as a smartphone, tablet or laptop computer. Note that the commissioning tool is typically not the same device as the lighting controller (not shown) which subsequently controls the lamps 12 in the operational phase, though that possibility is not excluded either.

The user 8 uses the commissioning tool 6 to at least instigate the commissioning of each of the luminaires 4 he or she wishes to pull into the control network, though in accordance with embodiments herein some or all of the rest of the process may then proceed in an automated fashion between the lamps 12 and the commissioning tool 6.

The controller 26 on each lamp 12 is configured to be able to operate its respective lamp 12 in either a factory new (FN) mode or a non factory new (non-FN) mode, and to switch between these modes. For example these may be the FN and non-FN modes of the ZigBee Light Link protocol. In the FN mode, the lamp 12 appears to the commissioning tool 6 as awaiting commissioning. For instance, this may be achieved by the controller 26 using its respective wireless interface 28 to repeatedly (e.g. periodically) emit beacons advertising that the respective lamp 12 is awaiting commissioning. Alternatively, this may be achieved by the controller 26 setting itself to respond to queries broadcast from the tool 6 to respond that the lamp 12 is awaiting commissioning. In the non-FN mode, the lamp 12 does not. For example, the controller 26 does not emit any beacons, or at least does not emit beacons advertising the lamp 12 as awaiting commissioning (e.g. it could stop emitting certain beacons, or change the content of its beacons so as not to state that the respective lamp is awaiting commissioning). Alternatively, the controller 26 may set itself to a mode in which it does not respond to the queries broadcast from the tool 6, or responds with a response that the lamp 12 is awaiting commissioning.

Thus when a lamp 12 is in the FN mode, the commissioning tool 6 will detect the lamp 12 as awaiting commissioning and display it as such to the user 8 through a user interface of the commissioning tool 6. In the non-FN mode on the other hand, the commissioning tool 6 will not see the lamp 12 as awaiting commissioning and hence will not display it as such to the user 8 through the user interface of the commissioning tool 6.

In embodiments, awaiting commissioning means at least awaiting being joined to a wireless network (e.g. ZigBee network) for the purposes of subsequent control in the operational phase. Hence in embodiments the controller 26 on each lamp 12 is configured to emit the above-described beacons when in the FN mode, but to stop emitting said beacons when in the non-FN mode, or in alternative embodiments to change the way it responds to queries broadcast from the commissioning tool searching for lamps 12 awaiting commissioning. By way of illustration, the following examples may be described in terms of the former implementation, where the FN mode controls whether or not the respective lamp 12 emits beacons (or at least whether it emits a certain type of beacon advertising it is waiting commissioning). In the latter implementation, if the commissioning tool 6 sends out an offer for an open network, the controller 26 of a master lamp will react to the offer but the slave lamp will ignore it.

Another property exploited by embodiments herein, is that a lamp configured according to a ZigBee standard such as the ZigBee Light Link standard will automatically switch from the FN mode to the non-FN mode when it joins a ZigBee network. Therefore according to embodiments herein, causing a lamp to join and leave a temporary network can be used to artificially manipulate the FN mode.

In accordance with exemplary techniques disclosed herein, the controller 26 on each of the lamps 12 is configured to obey a distributed master-slave protocol whereby it determines in a distributed fashion (without involving coordination by a centralized controller) whether it is itself to become a master or a slave for the purpose of the commissioning. The protocol is arranged such that one and only one lamp 12a per luminaire 4 will become master, and all the other lamps 12b, 12c, 12d in that same luminaire 14 will be slaves to the respective master 12a (N.B. the lamp labelled 12a is described herein as the master just by way of example—in general the master could be any of the lamps 12a-d in the same luminaire 4). Techniques for detecting which lamps 12a-d are within the same luminaire will be discussed in more detail later.

The controller 26 of the lamp 12a that becomes master then artificially manipulates the FN mode of its slaves 12b-d so as to hide all but the master 12a from being shown to the user 8 in the user interface of the commissioning tool 6. This is achieved by having the master 12*a* cause the slave lamps 12*b-d* to join a temporary wireless (e.g. ZigBee) network created by the master. Further, the controller 26 of the master lamp 12*a* performs one or more commissioning operations on behalf of itself and its slaves 12*b*-12*d* as a group. Thus from the user's perspective, the commissioning is only performed for each luminaire 4, not each individual lamp 12, with the commissioning involved in reporting the identifiers of the slaves 12*b*-12*d* to the commissioning tool 6 and joining the slaves into a network being performed entirely "behind the scenes".

The following describes an exemplary work flow for a situation in which, before the start of the auto-grouping, all TLED tubes 12*a-d* within the luminaire 4 are newly installed, i.e. Factory New (FN). This is illustrated by way of example for a room with N fixtures 4 each having four TLED tubes 12*a*-12*d*, being commissioned into a ZigBee network. Where it is described in the following that a lamp 12 performs a certain operation, it may be assumed that this is performed under the control of its respective controller 26, using the respective wireless interface 28 where appropriate.

Firstly, four times N factory new (FN) TLED tubes 12 are inserted into N luminaire fixtures 4 respectively. Initially, each FN TLED 12 detects no ZigBee network (or only a network or networks with below a threshold received strength, which it can assume must be from another luminaire or even another room—see the "bucketing" feature described later).

Every TLED 12 in the environment 2 then starts a new ZigbBee network, beginning in the FN mode (note: no bridge or remote control commissioning device 6 need present within the system at that time). This means each lamp 12 in the environment 2 transmits beacons communicating the fact that it is a new lamp searching for neighbours. These beacons include a unique identifier number (e.g. the 64 bit ZigBee address of the TLED). All TLEDs 12 also listen for these beacons, and analyse the addresses of the other TLEDs 12 versus their own address. The single TLED 12*a* with the lowest address starts the second phase of the auto-commissioning by modulating its 64 bit ZigBee address onto the ballast line connecting it to the ballast 10, by modulating the load it places on the ballast (to be discussed in more detail later). All other TLEDs 12 check if the power they received from the ballast 10 is being modulated. If so, these TLEDs 12*b-d* each grab the 64 bit address which it has received via the ballast load modulation. This 64 bit address is the ZigBee address of the master TLED 12*a* in its own luminaire 4. Note, the lamps 12 may not all turn on and begin the process at exactly the same time. Legally speaking the power of the luminaire 4 should be off during re-lamping, so if this rule is followed the lamps will all be turned on together after re-lamping and hence begin the process at the same time. In practice this rule is not always followed, but nonetheless, as long as the lamps 4 are configured to continue searching for potential masters or slaves for a certain finite window after power-up, the described process will still work.

An alternative approach for selecting a master would be to use a random timeout after powering-up the mains 16, before which each TLED 12 is allowed to start up its radio 28. The TLED 12 on which the radio 28 is first active becomes the master and starts up the network. The random timeout feature of the TLED tube 12 is disabled after a certain time period, e.g. one month, if the TLED 12 is still un-commissioned. This random timeout approach is however less preferred: the process costs time, and in addition it is hard to dimension for both small and large networks (the larger the network, the longer the required start-up delay will be). Whereas the load modulation works directly, and for any network size.

By whatever means the master and slaves are chosen, each of the slave TLEDs 12*b-d* subsequently joins the ZigBee network of the ZigBee master TLED device 12*a* (causing each of the slaves to switch to the non-FN mode and stop beaconing). The master TLED 12*a* notices one or more TLEDs 12*b-d* have joined its network. This network is used by the master 12*a* to obtain unique numbers (e.g. 6-digit remote reset codes) from its slaves 12*b-d*, wherein these are used later on during the commissioning process to pull the slave TLEDs 12*b-d* into the ZigBee network set up by the installer remote (commissioning tool) 6.

After it has been determined which of the TLEDs 12 are located in the same luminaire 4, the master TLED 12*a* saves the unique address of its slave TLED neighbours 12*b*-12*d*, along with network parameters and keys. The master TLED 12*a* exits the network it created for its slaves 12*b-d* and goes back to the FN mode so as to show up to the commissioning tool 6 as awaiting commissioning. However, it leaves its slave TLEDs 12*b-d* in this newly created network, so that they will not show up to the commissioning tool 6. Hence the master 12*a* acts as the representative of its slaves 12*b-d*.

As the master 12*a* has returned to the FN mode, this means it will start beaconing again. To avoid it being taken into account in the distributed protocol for selecting the next master, it therefore indicates in one or more of its beacons that it has already acted as master.

Regarding the beaconing generally, the TLEDs 12 require a mechanism to communicate some unique ID, their presence, and whether they have already been grouped per luminaire 4. Normal ZigBee beacons contain amongst other things the extended PAN ID of their network, but do not provide space or mechanism to include other information that the TLEDs 12 may need to exchange. Therefore, one of the following alternative methods may be used to indicate whether a master 12*a* returning to the FN mode has already been a master (has already grouped the lamps 12*b*-12*d* in its respective luminaire.

A first possibility is to use privately defined announcement messages over ZigBee. According to this approach, each lamp 12 starts its own ZigBee network without being open for other devices to join that network. At one or more times throughout the commissioning process (as the initial beaconing and/or later), each TLED 12 regularly (at some predefined interval) sends on its own network an inter-PAN announcement message containing information relevant for the present purpose (e.g. MAC address, indication of being master vs. slave TLED within a luminaire, whether or not auto-grouping with slave TLEDs in the luminaire already happened). For the rest of the time, it listens on either its own channel or all channels (see note below) for similar messages from other TLEDs 12. Each factory new TLED listens to all such messages within its radio range, and acts accordingly (see rest of text). If a TLED 12 has already performed the auto-grouping, it adjusts the contents of its announcement message accordingly. After commissioning is complete, sending the announcement messages may be continued for use cases such as replacing one of the TLEDs (discussed in more detail later).

The above could be performed with all TLEDs 12 on a ZigBee channel known to them all (easiest since devices need to listen only on one channel), or each TLED could choose on a random ZigBee channel (which means each device needs to listen on all channels—somewhat more involved but allows a good spread over all ZigBee channels).

A second possibility is to use modified beacons. This is similar to the first possibility above, but instead of the announcement messages using a beacon as defined in a ZigBee spec, the protocol byte is set to a value different from the values used for existing systems (00=ZigBee Pro, etc.) In the payload, the various information (same as described in relation to the first possibility above) is carried.

A third possibility is to use alternative type of beacons other than ZigBee beacons, of another protocol other than ZigBee. This is a variation on the first and second possibilities above, but the information in question is transmitted in the alternative beacons, e.g. BLE (Bluetooth Low Energy) iBeacons.

By whatever means the first master 12a indicates it has already been a master, other TLEDs 12 in other luminaires 4 which are not yet auto-grouped then notice they no longer received beacons from the master TLED 12a in the first luminaire without this indication being given. This means another TLED 12 will now have the lowest unique number, assign itself the master role for its luminaire 4 and repeat the above process for this luminaire. The whole process repeats until a respective master TLED 12 in every luminaire 4 has completed these steps.

Note: optionally, the process flow described above may be augmented by using a measure of the received signal strength of the beacons, e.g. a received signal strength indicator (RSSI), in order to help select tube neighbours 12b-12d within the luminaire 4 by detecting those having a high enough signal strength. That is, the RSSI can be used to speed up the TLED auto-commissioning process. Beacons with an RSSI below a predetermined threshold can be ignored so that multiple luminaires 4 (e.g. in a large open-plan office) can run the above auto-grouping process at the same time, independently verifying which TLEDs 12 are indeed housed within the same luminaires 4. RSSI alone is not necessarily reliable enough for identifying the TLEDs 12 residing within the same luminaire 4 with sufficient certainty. Hence, in embodiments the RSSI is only used to create RSSI-based buckets of TLEDs 12 (i.e. candidate subsets), e.g. those that are likely to be in the same luminaires, or those that might be in the same luminaire. Based on the buckets, a second identification mechanism is then used—for instance shorting the electric load of one master TLED 12a and detecting the ballast load change at another slave TLED 12b-d within the luminaire—to more reliably determine which TLEDs 12 are indeed housed within the same luminaires 4.

In the next phase of the commissioning flow, the installing user (person) 8 gets involved in the commissioning. The installing user 8 sees on his commissioning tool 6 only one FN lamp 12 displayed per luminaire 4 (i.e. the master TLED). If the user 8 wishes to include the luminaire 4 of one of these visible, FN lamps 12a in the network he or she is creating, then he or she selects that lamp 12a in the user interface of the commissioning tool 6. This causes the commissioning tool 6 to send a commissioning request to the selected lamp 12a. In response, this lamp 12a provides a visual indication to the user 8, e.g. by flashing its lighting element 18. The user 8 can thus see that the lamp 12a that he or she selected is indeed in the luminaire 4 that he or she intends to commission. If so, the user confirms this via the user interface of the commissioning tool 6, causing the commissioning tool 6 to include the master TLED into its ZigBee network (i.e. the wider ZigBee network being created for the purpose of controlling the lamps 12 in the subsequent operational phase). The master TLED 12a also tells the commissioning tool 6 about its three non-FN TLED slaves 12b-d (including their unique IDs, e.g. ZigBee addresses). The slave TLEDs 12b-d then join the ZigBee network set up by the commissioning tool (or a lighting bridge). There are at least three options for this.

A first option is for the commissioning tool 6 to use the slave TLEDs' unique IDs to pull the slave lamps 12b-d into its network using 6-digit reset codes. These can be broadcast by the commissioning tool 6 to make the slave TLEDs 12b-d become FN again and join the commissioning tool's remote network.

As a second option, the master TLED 12a temporarily goes back to the old network (the network it created with its slaves 12b-d) and uses this to transmit to its slave TLEDs 12b-d the parameters of the new network (the network being created by the commissioning tool 6). The slave TLED tubes 12b-d then switch to the new network, and the master TLED tube 12a also goes back to the new network of the commissioning tool 6.

In a third option, the commissioning tool 6 instructs the master TLED 12a to send a "remote reset" to its slave TLEDs 12b-d. The master TLED 12a temporarily goes back to the old network and transmits a "remote reset" to its slave TLEDs 12b-d, causing the slave TLEDs 12b-d to become FN again. The master TLED tube 12a then goes back to the network of the commissioning tool 6. The commissioning tool 6 searches for new devices and finds the three slave TLEDs 12b-d.

Thus the master and slave lamps 12a-d are all collectively pulled into a wireless network (e.g. ZigBee network) created by the commissioning tool 6, so that the lamps 12a-12 can subsequently be controlled via that network in the operational phase. Whatever option is used, preferably the commissioning tool 6 also assigns a group address (e.g. ZigBee group address) to the lamps 12a-12d in the same luminaire 4 (allocating a different respective group address to each respective luminaire). This group address then allows the controlling device (not shown) to control the lamps 12a-d together by broadcasting one or more control messages each with only a single group address as the destination address (rather than transmitting a separate message to an individual address of each lamp). For example, according to ZigBee messages can be broadcast with a group identifier, whereby only lamps 12 containing this identifier (i.e. being in this group) will react. When assigned, the commissioning tool 6 communicates the group address to the master 12a and each of the slaves. In the operation, each lamps 12a-12d then listens for any messages with the group address, and reacts accordingly. Note however that having a group address for all TLEDs within a luminaire is not necessarily required. Alternatively, once the commissioning process is finished, it is possible to simply address each TLED by its own individual address.

The above thus describes a mechanism by which an arrangement of newly installed luminaires 4 can be commissioned. A further situation in which the auto-grouping may be used is when one of the individual TLEDs 12 in a given luminaire 4 is replaced, at a later time after the initial commissioning phase is over and the operational phase has begun. The following describes a work flow for the replacement of one of the non-FN TLEDs tubes 12 in a luminaire 4. This connected TLED field-replacement aims at "out-of-the box" auto-commissioning of a replacement TLED 12 without involvement of a remote control or a commissioning expert. The auto-grouping process can be triggered by the combination of a factory new connected TLED tube 12 and power-cycling of the mains voltage 16 once via a switch. Alternatively, the re-lamping person may actively trigger the auto-commissioning for the replacement tube (e.g. five times mains-switch toggling within 10 sec).

The auto-commissioning of the replacement TLED proceeds as follows. The newly installed TLED, e.g. a replacement for 12b, sends a signal to the ballast 10, by modulating the load it places on the ballast 10. Other TLEDs 12a, 12c, 12d in the same luminaire 4 hear this message in the power supplied to them by the ballast 10. One of these TLEDs 12a, 12c, 12d opens its network (e.g. the one with the lowest unique address, or the TLED 12a which already became the master of the luminaire 4). The new TLED then joins the network. The master TLED 12a programs the appropriate ZigBee groups in the new TLED so it functions in the same way as the replaced TLED 12b.

This assumes that the commissioning tool 6 has allocated all TLEDs 12a-d in a luminaire 4 to a single ZigBee group. Having all TLEDs 12a-d within a luminaire 4 in the same group is very advantageous for this replacement use case, as then the Zigbee group number of the remaining old TLEDs 12a, 12c, 12d can be directly re-used for the new replacement TLED. Unlike Zigbee group addresses, normal ZigBee addresses do not have this characteristic: the new replacement TLED would always have a different 16-bit address than the old one.

The above mechanism may include a timeout in case no-one answers the request. Or as an alternative, the new TLED may send a request for a network over ZigBee, which is monitored by the other TLED(s) 12a, 12c, 12d—or at least the master 12a of the luminaire 4—and answered. Also here, signaling via the ballast line can be (and preferably is) used to verify that both are in the same luminaire 4. For TLED field replacement, this verification as to whether an "aspirant" wireless node wanting to join the lighting network is indeed connected to a fluorescent tube ballast 10 also serves as a security mechanism—it can only join if it is physically in the same luminaire 4 as an existing member 12a of the network, thus avoiding rogue devices joining for malicious purposes such as in an attempt to disrupt the lighting. Sharing the same fluorescent tube ballast 10 is in several ways the TLED market analogy to the touchlinking mechanism used for consumer applications. In consumer applications, the pairing procedure requires physical proximity for remote controls with the bulbs to prevent pairing of malicious new network components to the lamps e.g. from outside of the housing 14. In the same way, embodiments of the present disclosure enable an existing lamp 12a to assess the authorization of the new ZigBee component to join the network, by verifying that the new wireless component purporting to be a TLED is indeed wired on the same ballast 10 as the existing connected TLED 12a and hence indeed is a replacement TLED and not another malicious wireless device.

Figure 9:
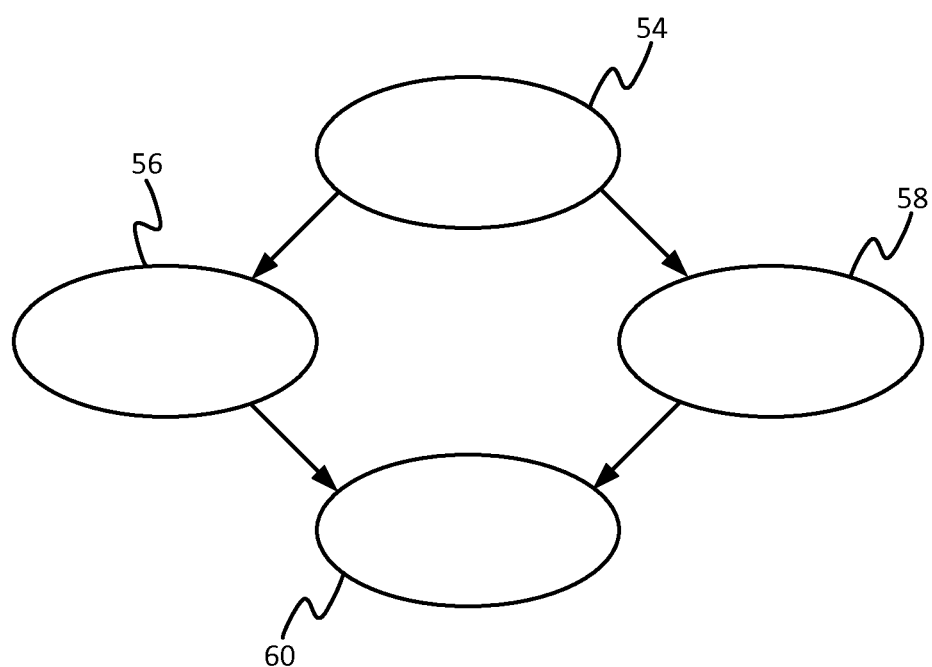
FIG. 9 is a schematic state diagram of a lamp.

To summarise the above, FIG. 9 gives a state diagram showing the different possible states of a lamp 12 in accordance with embodiments of the present disclosure. Every lamp begins life, when powered up for first the first time, in an "out of the box" state 54 where it performs the distributed negotiation protocol to determine whether to become a master or slave, as discussed above. Then, based on this, one of the lamps 12a transitions to the master state 56 while the others of the lamps in the same luminaire each transition to the slave state 58. While the first lamp 12a is in the master state 56 and the second lamp 12b-d are in the slave state 58, the master 12a interacts with the commissioning tool on behalf of the first and second lamps 12a-d collectively, in order to initiate one or more steps to commission those lamps 12a-d as a group. Finally, after commissioning is over, both the master and slave lamps 12a-12d transition to the operational state (operational phase) 60 where they are usable for their ultimate purpose, i.e. to be used to illuminate the environment 2, and be controlled via the ZigBee network or other such wireless network established by the commissioning tool (e.g. to be dimmed, used to set colour lighting scenes, etc.). In the operational state 60, each lamp 12 monitors for signals for potential replacement lamps as discussed above.

Note that whether (a) the lamp is FN ("Factory New") mode is a separate variable than whether (b) it is in the "out of the box", master, slave, or in the final operational state. This can be seen by considering that while a lamp is master, it switches between both FN and non-FN, and also while a lamp is a slave it can also switch between FN and non-FN—so (a) and (b) are separately controllable factors. Thus techniques disclosed herein involve deliberately and artificially manipulating the FN state so that it does not just indicate whether newly "out of the box", but is used for an extra purpose of controlling which of multiple lamps 12 in the same luminaire 4 appear to the commissioning tool 6.

Constrained Signalling Channel

The use of load-modulation to signal via the ballast may be particularly advantageous compared to RSSI-only-based auto-grouping. In the USA for instance, luminaires always have a continuous metal enclosure for both the upper top and the sidewalls of the luminaire 4. The metal side-walls of the luminaire block the direct wireless path (in the same plane) between the TLEDs 12 being housed in different luminaires 4. Consequently, the wireless attenuation between TLEDs 12 housed in two different luminaires 4 is typically stronger than for two adjacent TLEDs at 15-20 cm distance housed within the same luminaire 4. However, for smaller than usual installation distance between adjacent luminaires 4, the attenuation caused by the luminaire metal sidewalls will be under certain cases insufficient to prevent accidental auto-grouping of connected TLED tubes 12 from different luminaires (e.g. if a punch-out hole in metal sidewall of luminaire is located right next to the TLED's radios 28). In addition, each of the TLED tubes 12 may have its radio 28 located in only one of the end-caps 20i of the tube 12. Hence, there will be a 50% likelihood that two neighbouring TLED tubes 12a, 12b located within the same luminaire 4 will be mounted by the installer with the radio 28 at opposite ends of the tubes 12. Placing the antenna 28 in the middle of the TLED may overcome this problem. However, from a TLED hardware perspective, the preferred radio location in a connected TLED is within the end cap 20.

To ensure sufficient robustness, it is therefore preferable to "bucket" the TLEDs 12 with the help of RSSI, and then use a second grouping method to determine with certainty which TLEDs 12 are located within the same luminaire 4.

There are at least two options for the second auto-grouping method. One embodiment, as mentioned above, is that the master TLED 12a tube signals via the ballast 10 by modulating the load it places on the ballast 10 (e.g. to signal its unique ID). The other TLEDs 12b-d are then looking to detect the load transitions caused by their sister TLEDs within the same luminaire 4. This will be discussed in more detail shortly.

As an alternative embodiment however, each of the connected TLEDs 12 may have an integrated light sensor which can be used to allow the slaves 12b-d to detect a light modulation pattern emitted by the master TLED 12a located within same luminaire 4 (and/or the slaves 12b-d could emit a light pattern to be detected by the master 12a). The light sensor may be a pre-existing daylight sensor, or a dedicated light sensor for the purpose of the disclosed detection. The master 12a will selectively switch off the light within the luminaire 4 to aid the master TLED tube to receive coded light messages from its neighbours 12b-d without disturbance from its own light. Coded light can be used to detect which lamps 12 are in the same luminaire because the housing 14 of the luminaire 4 acts to at least partially block coded light signals—so lamps 12a-d in the same luminaire 4 will receive each others' signals but not those from lamps 12 in other luminaires 4. To facilitate this, the light sensors and/or positions of the lamps 12 may be specifically arranged so that the light sensor of a given lamp 12 in a given luminaire 4 only, or at least predominantly, receives light from lamps in the same luminaire 4. E.g. the light sensor may be arranged to face upwards to detect the light reflected from an upper reflective element in the interior of the respective luminaire housing 14. A similar principle could even be applied using other media as the means by which to detect whether lamps 12 are in the same luminaire: e.g. each lamp 12 may emit an ultrasound signal that is blocked by the housing 14, or each lamp 12 may emit a radio signal which is blocked by metal elements around the sides of the luminaire housing 14 (such that signals can be received from a controller or commissioning tool 6 below the luminaire 4, but not from other luminaires mounted on the same ceiling).

As an additional feature, in embodiments, by using the light sensor per TLED 12 it is possible to identify the relative positioning of the TLED tubes 12a-d within the luminaire 4. This enables directional lighting sweeps across the four TLEDs 12a-d within the luminaire 4 (from left to right, or from right to left). This dynamic swiveling light beam may make it possible to identify the directionality among neighboring luminaires 4, which may enable auto-commissioning at room level In this approach, the TLEDs 12 housed within the same luminaire 4 sequentially switch on their light from left side to right side of the luminaire. At the same time, the LEDs of the TLEDs in the neighbouring luminaires remain switched off, but detect with a light sensing means the light lux level on the floor caused during the sequential switching on of the TLED tubes within the neighbouring luminaires. The physically closer the lighted-up TLED tube is to the receiving TLED, the more light will be on the floor. Based on the detected the lux level on the floor during the step-wise switching of the tubes, the TLED tube (in light off mode) can deduce whether the neighbouring luminaire performing the sweeping light is actually located on its right or its left side The following now describes an exemplary implementation of the technique for intentionally modulating the load placed on the ballast 10 by the master 12a, in order to signal a pattern in the power supplied by the ballast 10 to the lamps 12a-d in the same luminaire 4.

Figure 4:
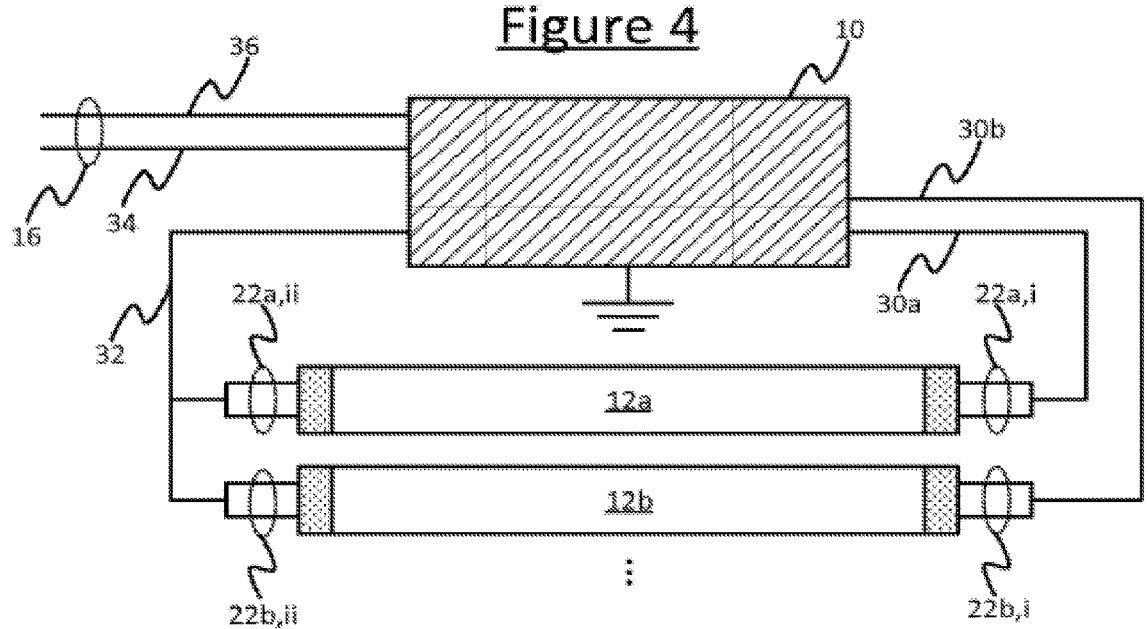
FIG. 4 is a schematic wiring diagram for a luminaire with multiple lamps.

As discussed, a fluorescent luminaire 4 typically takes several TL tubes 12a-d wired to one single ballast 10. A typical wiring diagram for an instant start (IS) ballast 10 is shown in FIG. 4. At each end of the TL tube 12, the two pins 22 are shorted by a shunted lamp holder. The pins 22a,i at one end of a first of the lamps 12a in the luminaire 4 are connected to the ballast 10 via a first blue line 30a, and the pins 22b,i at one end of a second of the lamps 12b are connected to the ballast 10 by a second blue line 30a (and so forth if there are more than two lamps in the luminaire). At the other end, the pins 22a,ii and 22b,ii (etc.) are all connected together and connected to the ballast 10 via the same red line 32. The ballast 10 itself is connected to the mains 16 via the black line 34 and white line 36.

Figure 5:
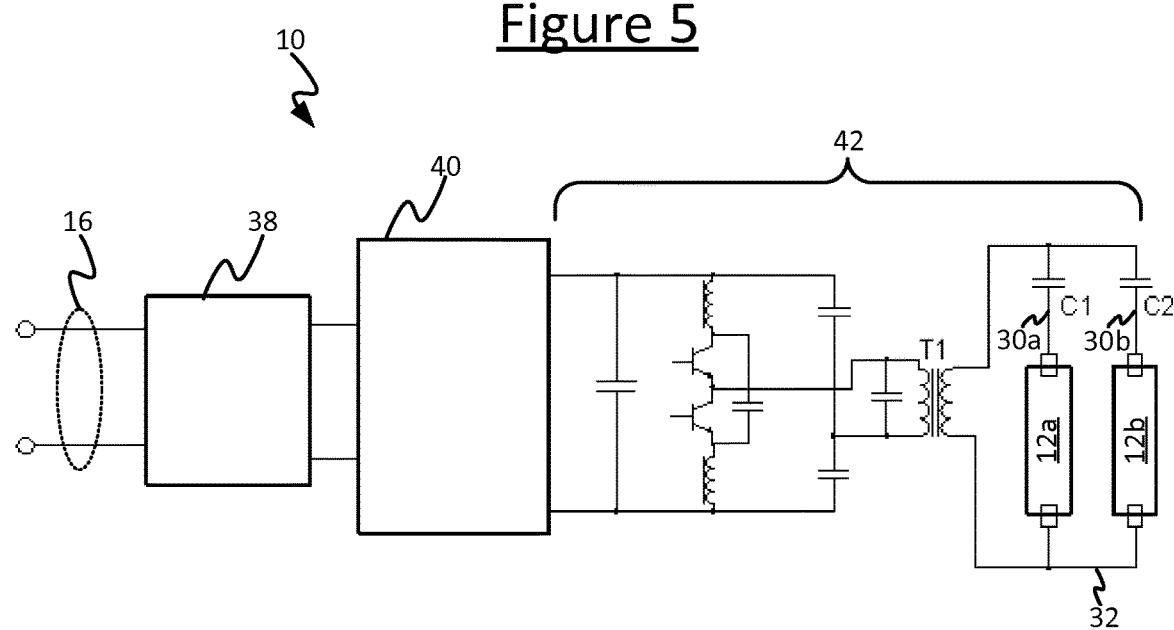
FIG. 5 is a schematic circuit diagram of a ballast.
Figure 6:
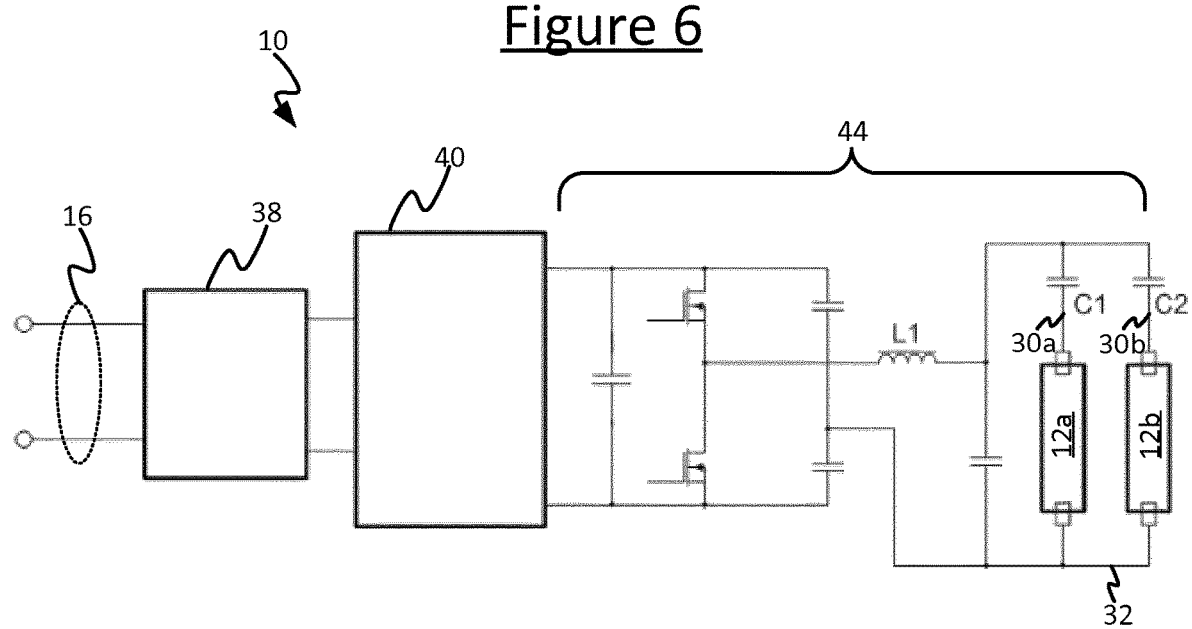
FIG. 6 is a schematic circuit diagram of another ballast.

FIGS. 5 and 6 show examples of different types of ballast 10 for powering fluorescent tubes. By way of example, these are the dominant topologies in NAM regions for Instant Start (IS) ballasts, namely the self-oscillating (SO) circuit (see FIG. 5) and current-fed half-bridge resonant circuit (see FIG. 6).

FIG. 5 shows a typical High Frequency (HF) fluorescent ballast. This ballast 10 consists of an EMI (electromagnetic interference) filter 38 arranged to receive the upstream mains power supply 16, and to filter this to produce a filtered power supply and to block the interference generated by the ballast back to the mains. The ballast 10 also comprises a PFC (power factor correction) input stage 40 connected to receive the filtered power supply from the EMI filter 38, and to perform a power factor correction on the filtered power supply in order to produce a power factor corrected power supply. The circuit further comprises a resonant output stage 42 connected to receive the power factor corrected power supply from the power factor correction stage 40. This circuit works in self-oscillating mode in order to generate, based on the received power factor corrected power supply, the final power supply as used to power the fluorescent tubes (or their TLED replacements 12). The two transistors in the resonant circuit 42 are driven by the auxiliary winding of the transformer T1. The output is typically isolated from the mains 16. The ballast 10 thus generates a HF voltage of about 600V across the secondary winding of T1. Capacitors C1 and C2 are connected in series with each of the lamps 12a, 12b respectively. The capacitors C1, C2 act as a ballasting element and control the lamp current.

In recent products, the half-bridge (HB) resonant circuit has become more popular due to its cost saving. A typical HB fluorescent ballast topology is shown in FIG. 6. This circuit is similar to that of FIG. 5, but with the SO resonant circuit 42 replaced with a HB circuit 44. The HB circuit 44 is typically controlled by an integrated circuit (IC). The output is not isolated from the mains 16.

Figure 7:
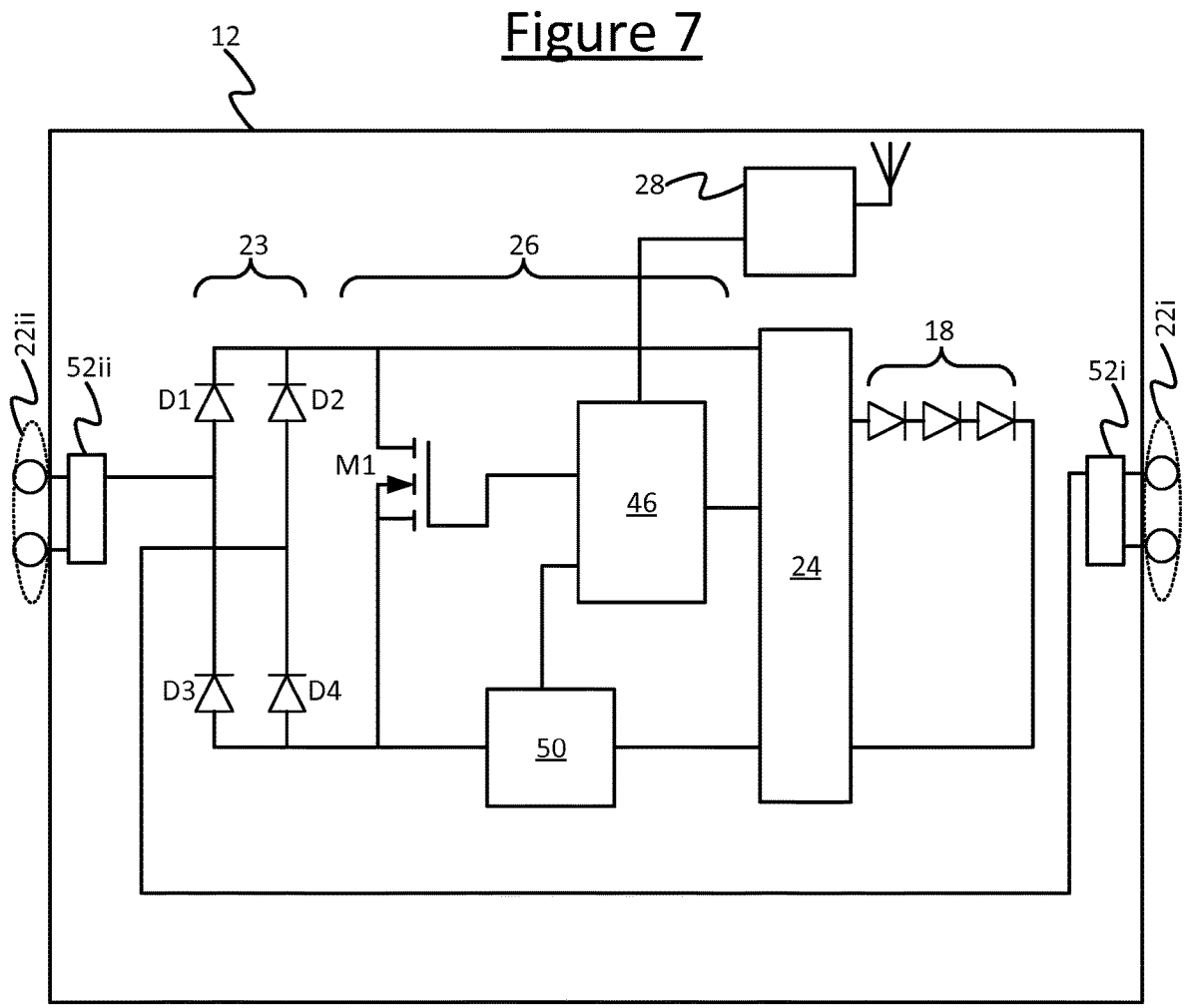
FIG. 7 is a schematic circuit diagram of a lamp.

Details of some exemplary techniques for transmitting and receiving a signal via ballasts 10 such as those shown in FIGS. 5 and 6, or others, are now described in more detail in relation to FIG. 7.

FIG. 7 shows an example lamp 12 for performing load modulation in order to signal via the ballast 10, and also to detect such signals from other lamps 12 via the power supply received from the ballast 10. In embodiments, each of the lamps 12 in one, some or all of the luminaires 4 may be configured in accordance with FIG. 7.

As shown in FIG. 7, the lamp 12 comprise a rectifier 23 comprising an arrangement of diodes D1, D2, D3, D4 arranged to receive an AC power supply from the ballast 10 via the pins 22 of the lamp 12, and to convert this to DC power. Various forms of rectifier are in themselves known to a person skilled in the art and the rectifier 23 does not necessarily have to take the form shown in FIG. 7 (though it may well do). The lamp 12 further comprises an LED driver 24 arranged to receive the DC power from the rectifier 23, and based on this to generate a constant or approximately constant current to the LED-based lighting element 18 (LED string or array). Note however that a constant current, as referred to herein, does not necessarily mean the current is not adjustable. Rather, the lamp 24 comprises a controller 26, e.g. comprising a microcontroller 46 arranged to execute embedded firmware of the lamp 12. Further, the lamp 12 comprises a wireless interface 28, e.g. ZigBee, Wi-Fi, 802.15.4 or Bluetooth interface (the above has been described primarily in terms of the ZigBee example). The microcontroller 46 is connected to the wireless interface 28 and to the LED driver 24. It is arranged to receive messages via the wireless interface 28, e.g. originating from a lighting controller or one or more wireless sensors (not shown), and based thereon to determine a light output level with which the lighting element 18 is to emit light. The microcontroller 46 then indicates this light output level to the LED driver 24, and in response the LED driver 24 sets the current to the appropriate level to achieve the desired light output. The current supplied by the LED driver 24 is therefore constant in that for a given light output indicated by the controller 26, the LED driver 24 ensures that the current is approximately constant. Also, note that in the case where pulse width modulation (PWM) dimming or such like is used, the constant current refers to the average current. Further, in embodiments, the LED-based lighting element 28 may comprise differently coloured, independently controllable LEDs or subarrays of LEDs. In this case the controller 26 and LED driver 24 may also individually set the output levels of each the differently-coloured LEDs or subarrays in order to control the colour of the light output.

In order to signal via the ballast 10, the internal controller 26 of the lamp 12 further comprises transmitting circuitry in the form of a transistor switch M1, connected so as to be able to modulate the load placed on the ballast 10 by the respective lamp 12, under the control of the microcontroller 46. In the example embodiment shown, this is achieved by connecting the source and drain (or collector and emitter) of the transistor M1 in parallel across the load, e.g. across the LED driver 24 or lighting element 18, with the gate (or base) of the transistor M1 being connected to the controller 26. This allows the controller 26 to selectively short out the load by controlling the gate (or base) of the transistor M1. When it does so, this causes a "hiccough" to be fed back through the ballast 10, which is detectable in the power received by the other lamps 12 in the same luminaire 4. By controlling the shorting according to a suitable, predetermined code (see below), it is thus possible to signal to other lamps 12 in the same luminaire 4 via the ballast 10.

To be able to sense such signals from other similar lamps 12 in the same luminaire 4, the lamp 12 of FIG. 7 further comprises a sensing circuit 50 connected between the rectifier 23 and LED driver 24 (though it could potentially be connected in other parts of the circuit). This circuit 50 is configured to detect the signalled pattern of "hiccoughs" in the power supplied by the ballast 10, and to supply the detected signal to the controller 26 for decoding. The sensing circuit 50 may be configured to sense the modulations in the received power by sensing modulations in the current, voltage and/or frequency of the received power. E.g. in embodiments, the sensing circuit 50 is a current sensing circuit.

Thus the controller 26 can transmit signals via the ballast 10 and also act on such signals according to the various commissioning flow steps disclosed herein, in order to perform the auto-grouping of the lamps 12a-d in the same luminaire 4.

To begin the TLED grouping method, one master TLED lamp 12a (e.g. out of a bucket of TLEDs likely sharing the same luminaire 4) initiates the auto-grouping process. During the auto-grouping process this master TLED lamp 12a starts the LED load shunting process, and opens and closes the switch M1 at a predefined frequency and duty cycle (as determined by the microcontroller 46). Each of the slave TLED lamps 12b-d senses the change in the lamp current via its internal current-detection unit 50. When the master TLED lamp 12a performs this coded shunting action, the loading condition of the ballast 10 changes and the ballast deviates from its normal operating point. Consequently, the remaining TLED lamps 12b-d in the group receive either more or less power from the ballast 10. The magnitude and direction of the change depends the fluorescent ballast topology, but in any case a change will be a noticeable to the slave TLED 12b-d. The slave TLED lamps sense this change by the means of the detection unit 50 inside the lamp. Because the ballast 10 is a current source, the coded shorting performed by the master TLED 12a lamp is a safe action and will not damage the ballast 10 or any of the TLED lamps 12a-d.

The load shorting functionality can be implemented at low cost within a TLED 12, e.g. with a shunt switch M1 as illustrated in FIG. 7. In each TLED 12, an instance of this shunt switch M1 is placed after the rectifier 23 (this switch M1 may in fact already be present in existing TLEDs 12 for pulse width modulation dimming purposes). When M1 closes, the lamp input is shorted and the current from the ballast 10 is bypassed without delivering power to the LED load 18. For detecting the codes sent by other TLEDs 12, an instance of the current detection block 50 is inserted into the main current loop of each TLED lamp 12. The coded changes in the ballast current and frequency are sensed via this detection block 50, and the extracted signal is fed to the on-board microcontroller 46 within the TLED 12. The same microcontroller 26 also controls the shunt switch M1.

Note that in embodiments, filament circuitry 52i, 52ii may be included at the inputs 22i 22ii on the two sides of the TLED 12 respectively, in order to emulate the filament of a real fluorescent tube lamp. This circuitry 52 may for example be a power resistor, or may be left open for instant start ballasts. The filament circuit 52 hence will pass the signalled codes without any impact on the signal.

Figure 8:
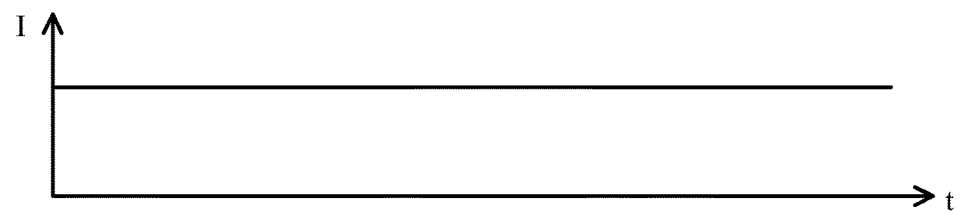
FIG. 8 is a schematic timing diagram showing a current sensed by a lamp.
Figure 8:
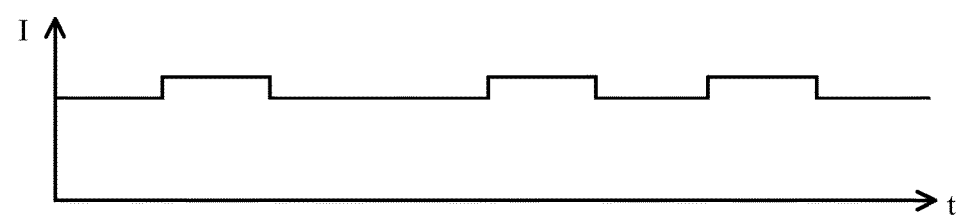

FIG. 8 illustrates an example shape of the ballast current I in the time domain t (after conditioning) as received by a slave lamp 12b-d according to embodiments disclosed herein. The top sketch shows the current during normal operation, whereby the ballast current received by the slave TLED 12a-d is at a stable level. The master TLED lamp 12a then starts with the grouping process and forces a coded pattern onto the ballast 10. Consequently, as illustrated in the bottom sketch of FIG. 8, the current received by the slave TLED 12b-d contains a modulated signal pattern with the frequency equal to the shunting frequency of the master lamp. The shunting frequency can be for instance in the 1-10 Hz range, or in the range of a few hundred Hz to a few kHz (preferably the mains frequency is avoided to minimize unwanted interference by the mains frequency components).

There are several ways for the current detection unit 50 to detect the coded modulation pattern. In a first option, the detection is done by sensing the change in the average current value. First the sensed signal is averaged via a low-pass filter. Then the value is read by the microcontroller 46 and compared to the nominal value. The microcontroller 46 then decides if this represents a signal from another lamp 12 sharing a common ballast 10 with its own respective lamp 12. E.g. each slave lamp 12b-d may listen on the ballast 10 for a signal from the master 12a identifying the master, and if the slave 12b-d detects this, the respective slave 12b-d replies to the master 12a via the wireless interface 28 to inform the master 12a of the slave's identity (e.g. address). Or operating the other way round, the master 12a may listen on the ballast 10 for signals received from the slaves 12b-d identifying themselves to the master 12a over the ballast 10.

As a second, alternative or additional option for the detection, the detection may be done by measuring the frequency of the received modulations. If required, the master TLED lamp 12a can even send some basic message to the slave lamps 12b-d by modulating the frequency, duty cycle, etc. This second option is more accurate than the first option above, since different ballast circuit topologies result in different modulation depths of TLED current. The average value detection method used by the first option is therefore more prone to errors than the second option (though not necessarily unusably so).

Regarding the coding scheme used to signal information via the ballast load modification scheme disclosed above, various coding schemes are possible. For instance, the ballast-based communication channel between master and slave TLEDs 12a-d may utilize a binary coding scheme such as Morse code, Manchester coding, or pulse position modulation, etc. The information signalled may comprise some or all the transmitting lamp's 64-bit unique ZigBee address (or other unique identifier), optionally along with some other bits such as header bits, start and stop bits, and/or possible error detection or correction bits. In certain embodiments, this communication channel may also allow for sending additional information, e.g. via the addition of a byte of "opcode". The slave lamps 12b-d may be enabled to acknowledge to the master 12b-d that they have received the signal, either back via the ballast 10 or via the wireless interface 28. After the signalling, the master 12 returns to the FN mode and engages with the commissioning tool 6 as discussed previously.

Note that the signalling over the ballast 10 could also be implemented via modulating only a portion of the luminance range (e.g. between 100% and 80% light output) rather than full 100% to 0% (light off) modulation of the LEDs 18. Similar to coded light type coding, this 100%-80% modulation may be even utilized later in the operational phase for ballast-load-change based 'side channel', which is invisible to the end user during normal lighting operation.

After completion of the auto-grouping, both the master and slave TLED lamps 12a-d cannot be controlled until they have been commissioned by the installer 8. There a several options as to which light levels to choose during the state where the TLEDs 12a-d are auto-grouped but not yet commissioned. In one embodiment, the master lamp 12a and slave lamps 12b-12d are automatically set at different light levels to enable a quick visual check for the (first) installer 8 as to whether the auto-pairing was done correctly.

FURTHER EMBODIMENTS

It will be appreciated that the above embodiments have been described only by way of example.

For instance, while the above has been described in terms of a microcontroller 46 in each lamp 12 performing the various respective functionality, it will be appreciated that any software or hardware implementation of a controller 46 could be used to implement the same functionality. E.g. the described functionality of the microcontroller 46 may instead be implemented in software running on multiple processors, or in dedicated hardware circuitry, or in configurable or reconfigurable circuitry such as a PGA or FPGA.

Further, the commissioning flow disclosed above can also be used with other protocols, not just ZigBee or ZigBee Light Link. Most fundamentally the factory new mode is a mode in which a lamp 12 appears as new to the commissioning tool 6, i.e. appears as awaiting commissioning, and the non factory new mode is one in which the lamp 12 does not appear as new to the commissioning tool 6. Other protocols may have or may be modified to incorporate a similar pair of modes, and could also benefit by using the principle of artificially manipulating the factory new mode (or the like) to jointly represent lamps 12a-d in the same luminaire 4 as part of the commissioning process.

Further, in the above, it has been described that the master 12a detects other lamps 12b-12d in the same luminaire 4 by signalling on the ballast 10, then receiving the identifiers of those other lamps back via another medium in the form of a wireless network (e.g. ZigBee network). But alternatively, the slaves 12b-d could instead respond back also via the ballast 10 (e.g. each sends its response at a random time, or using a carrier sense multiple access technique). Or as another alternative, the slaves 12b-d could initially signal their identities to the master via the ballast 10 (without waiting for a signal from the master first). Also, the protocol for determining which to lamp is to become the master could be implemented via other means, not just radio beacons; e.g. via the ballast 10, or via coded light or ultrasound. Moreover, alternative protocols for selecting the master could be used: e.g. the master need not necessarily be the lamp with the lowest address, but could instead be the lamp with the highest address, or the address (or more generally ID) chosen according to some other rule. Or the selection need not even be based on the address or identifier, and could instead be based on some other attribute in the beacons, such as a separate priority indicator in each beacon (such that the lamp with the highest priority level becomes master).

Further, the commissioning flow is not limited to grouping lamps 12a-d in the same luminaire 4. More generally, the disclosed commissioning flow can also be used with other ways of determining the lamps 12 to be grouped, not just based on detecting whether in same luminaire 4. For example, other reasons to group lamps could include grouping clusters or zones of lamps within a room. In such cases, it is possible to arrange the lamps 12 to each emit a signal such as a coded light signal, radio signal or ultrasound signal comprising an identifier of the respective lamp 12 (without that signal necessarily being hindered by the respective housing 14); and to arrange each of the lamps 12 to also listen for the signals from others of its neighbouring lamps in order to measure the received signal strength (e.g. RSSI) or time-of-flight (ToF). By collecting together these measurements (either at master one of the lamps 12 or at a central device such as the commissioning tool 6 or a lighting bridge), it is possible to detect the relative distances between the different lamps 12 and thereby infer the topology of the lamps 12 in the environment 2, so as to detect which are to be considered in the same cluster.

Conversely, the disclosed techniques for detecting whether lamps are in the same luminaire may be used with other commissioning flows, not necessarily involving the manipulation of the factory new mode or the like, or indeed in any other situation where it may be desired to detect that lamps are the same luminaire 4 (e.g. for auditing purposes, or to control as a group in an ad hoc manner without a specific commissioning phase).

Further, there are other possibilities for modulating the load, other than the on/off (in/out) approach shown in FIG. 7 whereby the switch M1 is used to switch the load between either zero or the full load. E.g. alternatively, the LEDs 18 and/or driver 24 may stay connected in circuit and not be completely shorted, but a switchable or variable resistance or impedance may be included in series or in parallel with the LEDs 18 and/or driver 24, and the microcontroller 46 may control this switchable or variable resistance or impedance in order to modulate the load. Or more generally, other power line communication techniques may be available to a person skilled in the art. Moreover, the disclosed technique of modulating the power may be applied not just in the context of a ballast 10, but any other power supply circuit, e.g. a circuit comprising a transformer.

Note also for the avoidance of doubt that the term "wireless lamp" or such like, as used herein, refers to the fact that the lamp is able to communicate wirelessly, not that it does not need to be plugged in for power. in general the wireless lamp may be powered by any means, such as by mains power or by a battery, e.g. a TLED tube may be powered by an emergency lighting battery housed within the luminaire.

Further, the term beacon in this application is not restricted to be a ZigBee Beacon, but could also be any message which is sent out repeatedly by the lamp, for instance a message looking for an open network (or any message exposing an open network). Another alternative method is that the device will or will not respond to offers of open networks depending on its master/slave state. In this case, the lamps only listen and do not send beacons per se. Rather, if the commissioning tool sends an offer of an open network, the master device will react to the offer but slave device will ignore it.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A first lamp for use with one or more other lamps in a multi-lamp luminaire, each lamp being operable to emit respective illumination embedded with a predetermined coded light message; wherein the first lamp comprises:
   one or more light-emitting elements for emitting the respective illumination;
   a local controller;
   a switch configured to enable the local controller to communicate with a corresponding controller on each of the one or more other lamps in the multi-lamp luminaire, the communication comprising sending and/or receiving one or more signals; and
   a coded light transmitter operable to modulate the coded light message into the respective illumination of the first lamp;
   wherein the local controller is configured to coordinate with the corresponding controllers of the one or more other lamps, based on the communication via said switch, to prevent unsynchronized instances of said coded light message being transmitted from different ones of the lamps in the multi-lamp luminaire by determining if the first lamp and the one or more other lamps are within the multi-lamp luminaire, the local controller being further configured such that said coordination comprises either:
   a) coordinating that each of the first lamp and the one or more other lamps transmit a respective instance of the same coded light message by assigning the coded light message to the first lamp and the one or more lamps, and synchronizing all the instances of said message to be transmitted starting at the same time, or
   b) coordinating that only one of the lamps in the multi-lamp luminaire transmits the message, and none other of the lamps in the multi-lamp luminaire transmit any coded light, such that if the first lamp is to transmit said message then the local controller selects to operate the first lamp in a coded-light-transmission mode in which the coded light transmitter transmits said message, whereas if one of the other lamps is to transmit the message the local controller selects to operate the first lamp in a no-coded-light-transmission mode in which the first lamp does not transmit said message.

2. The first lamp of claim 1 comprising a mechanical connector for connecting to a complementary connector of the multi-lamp luminaire, to connect the one or more light emitting elements to a power supply circuit of the multi-lamp luminaire in order to power the one or more light-emitting elements to emit the respective illumination.

3. The first lamp of claim 2, wherein the local controller is configured to perform said coordination by a); and wherein the first lamp further comprises timing circuitry configured to use a cyclical variation in a voltage and/or current of the power supplied by the power supply circuit in order to derive a clock signal common to the first lamp and the one or more other lamps, wherein the coded light transmitter is configured to synchronize the start of the respective instance of the coded light message to said clock signal, thereby synchronizing the start of the respective message to the start of the messages transmitted by the one or more other lamps.

4. The first lamp of claim 3, wherein said timing circuitry comprises a divider, wherein the coded light transmitter is configured to derive the clock via the divider so that the clock signal has a lower frequency than said cyclical variation in the power supply.

5. The first lamp of claim 1, wherein:
   the local controller is configured to perform said coordination by b);
   the local controller is configured to select between operating the first lamp in a plurality of different substates of the coded-light-transmission mode, each substate modulating said message into the respective illumination with a different modulation depth; and
   the local controller is further configured to detect what number of other lamps are present in the multi-lamp luminaire based on the communication via the switch, and to select between the different substates in dependence on the detected number.

6. The first lamp of claim 5, wherein the local controller is configured to receive a dimming signal instructing the first lamp and the one or more other lamps to adjust the intensity of their respective illumination up or down; and
   wherein the local controller is further configured so as, in response to the dimming signal, to adjust the respective emitted from the first lamp by a lesser proportion relative to the one or more other lamps on condition of the first lamp being in the coded-light-transmission mode, but to adjust the respective illumination by a greater proportion relative to the one of the other lamps transmitting the message on condition that the first lamp is in the no-coded-light-transmission mode.

7. The first lamp of claim 1, wherein the switch is configured to perform said communication via a constrained signaling channel whereby propagation of the one or more signals is constrained by a physical property of the luminaire, thereby limiting the one or more signals to being communicated between only those lamps in the same multi-lamp luminaire and not any other luminaire.

8. The first lamp of claim 7, wherein the constrained signaling channel comprises the power supply circuit powering the first lamp and the one or more other lamps, the switch being configured to perform said communication by modulating a current and/or voltage of the power supplied by said power supply circuit, the propagation of the one or more signals thereby being constrained to the power supply circuit within the same multi-lamp luminaire as the first lamp and the one or more other lamps.

9. The first lamp of claim 1, wherein the first lamp takes the form of a retrofittable LED-based lamp for replacing a fluorescent tube.

10. The multi-lamp luminaire comprising the first lamp of claim 1 and the one or more other lamps.

11. The luminaire of claim 10, comprising a shared optical cavity in which the first lamp and the one or more other lamps are housed.

12. The luminaire of claim 11, wherein the optical cavity is formed within a diffuser.

13. A method of operating a group of lamps in a multi-lamp luminaire, each lamp being operable to emit respective illumination embedded with a predetermined coded light message, and each comprising a respective local controller wherein the method comprises:
  communicating between the local controllers of the lamps within the multi-lamp luminaire in order to coordinate that unsynchronized instances of said coded light message are not transmitted from different ones of the lamps in the multi-lamp luminaire by determining if the first lamp and the one or more other lamps are within the multi-lamp luminaire, said coordination further comprising either:
  a coordinating that each of the first lamp and the one or more other lamps transmit a respective instance of the same coded light message by assigning the coded light message to the first lamp and the one or more lamps, and synchronizing all the instances of said message to be transmitted starting at the same time, or
  b) coordinating that only one of the lamps in the multi-lamp luminaire transmits the message, and none other of the lamps in the multi-lamp luminaire transmit any coded light, such that if the first lamp is to transmit said message then the local controller selects to operate the first lamp in a coded-light-transmission mode in which the coded light transmitter transmits said message, whereas if one of the other lamps is to transmit the message the local controller selects to operate the first lamp in a no-coded-light-transmission mode in which the first lamp does not transmit said message.

14. A first lamp for use with one or more other lamps in a multi-lamp luminaire, each lamp being operable to emit respective illumination embedded with a predetermined coded light message; wherein the first lamp comprises:
  one or more light-emitting diodes for emitting the respective illumination;
  a local controller;
  a switch configured to enable the local controller to communicate with a corresponding controller on each of the one or more other lamps in the multi-lamp luminaire, the communication comprising sending and/or receiving one or more signals; and
  a coded light transmitter operable to modulate the coded light message into the respective illumination of the first lamp;
  wherein the local controller is configured to coordinate with the corresponding controllers of the one or more other lamps, based on the communication via said switch, to prevent unsynchronized instances of said coded light message being transmitted from different ones of the lamps in the multi-lamp luminaire by determining if the first lamp and the one or more other lamps are within the multi-lamp luminaire, the local controller being further_configured such that said coordination comprises either:
  a) coordinating that each of the first lamp and the one or more other lamps transmit a respective instance of the same coded light message by assigning the coded light message to the first lamp and the one or more lamps, and synchronizing all the instances of said message to be transmitted starting at the same time, or
  b) coordinating that only one of the lamps in the multi-lamp luminaire transmits the message, and none other of the lamps in the multi-lamp luminaire transmit any coded light, such that if the first lamp is to transmit said message then the local controller selects to operate the first lamp in a coded-light-transmission mode in which the coded light transmitter transmits said message, whereas if one of the other lamps is to transmit the message the local controller selects to operate the first lamp in a no-coded-light-transmission mode in which the first lamp does not transmit said message.

* * * * *